(12) United States Patent
Schiff et al.

(10) Patent No.: US 12,507,930 B2
(45) Date of Patent: Dec. 30, 2025

(54) METHODS FOR SELECTIVE ACTIVATION OF CENTRAL THALAMUS FIBERS IN A SUBJECT AND SYSTEMS THEREFOR

(71) Applicants: CORNELL UNIVERSITY, Ithaca, NY (US); THE UNIVERSITY OF UTAH, Salt Lake City, UT (US)

(72) Inventors: Nicholas Schiff, New York, NY (US); Jonathan Baker, Scarsdale, NY (US); Keith Purpura, New York, NY (US); Andrew Janson, Salt Lake City, UT (US); Christopher Butson, Salt Lake City, UT (US)

(73) Assignees: CORNELL UNIVERSITY, Ithaca, NY (US); THE UNIVERSITY OF UTAH, Salt Lake City, UT (US)

( * ) Notice: Subject to any disclaimer, the term of this patent is extended or adjusted under 35 U.S.C. 154(b) by 608 days.

(21) Appl. No.: 17/913,552

(22) PCT Filed: Mar. 23, 2021

(86) PCT No.: PCT/US2021/023648
§ 371 (c)(1),
(2) Date: Sep. 22, 2022

(87) PCT Pub. No.: WO2021/195062
PCT Pub. Date: Sep. 30, 2021

(65) Prior Publication Data
US 2023/0117972 A1  Apr. 20, 2023

Related U.S. Application Data

(60) Provisional application No. 62/993,468, filed on Mar. 23, 2020.

(51) Int. Cl.
*A61B 5/24* (2021.01)
*A61B 5/00* (2006.01)

(52) U.S. Cl.
CPC .............. *A61B 5/24* (2021.01); *A61B 5/4064* (2013.01)

(58) Field of Classification Search
CPC ................................ A61B 5/24; A61B 5/4064
See application file for complete search history.

(56) References Cited

U.S. PATENT DOCUMENTS 6,539,263 B1 * 3/2003 Schiff ...................... A61N 1/32
607/45
7,167,760 B2 1/2007 Dawant et al.
(Continued)

OTHER PUBLICATIONS

International Search Report and Written Opinion for corresponding Application No. PCT/US2021/023648 (mailed Aug. 23, 2021).
(Continued)

*Primary Examiner* — Christopher A Flory
(74) *Attorney, Agent, or Firm* — Troutman Pepper Locke LLP (Rochester)

(57) ABSTRACT

A method for selective activation of central thalamus fibers in a subject is disclosed. The method involves providing one or more electrodes each with one or more contacts. The one or more electrodes are positioned in the subject's central thalamus fibers. An electrical stimulus is applied to the positioned one or more electrodes to selectively activate the central thalamus fibers of the subject. The positioning and applying are carried out to maximize central lateral nucleus and medial dorsal tegmental tract fiber pathway activation in the subject and to minimize central median parafascicularis fiber pathway activation in the subject. Methods, devices, and computer readable media for surgical planning involving selective activation of central thalamus fibers in a subject are also disclosed.

12 Claims, 15 Drawing Sheets

(56) References Cited

U.S. PATENT DOCUMENTS

| | | |
|---|---|---|
| 7,623,927 B2 | 11/2009 | Rezai |
| 7,894,903 B2 | 2/2011 | John |
| 8,046,077 B2 | 10/2011 | York et al. |
| 8,160,676 B2 | 4/2012 | Gielen et al. |
| 8,506,469 B2 | 8/2013 | Dietrich et al. |
| 8,565,886 B2 | 10/2013 | Nelson et al. |
| 8,706,181 B2 | 4/2014 | Stypulkowski et al. |
| 9,215,298 B2 * | 12/2015 | Schiff ................ G06F 3/015 |
| 9,592,383 B2 | 3/2017 | Schiff et al. |
| 9,615,789 B2 | 4/2017 | Deisseroth et al. |
| 9,867,978 B1 | 1/2018 | Rapoport et al. |
| 9,937,347 B2 | 4/2018 | Mcintyre et al. |
| 2004/0172091 A1 | 9/2004 | Rezai |
| 2008/0288018 A1 * | 11/2008 | Rezai ................ A61N 1/36082 607/45 |
| 2009/0319001 A1 * | 12/2009 | Schiff ................ A61N 1/36082 607/45 |
| 2011/0208265 A1 | 8/2011 | Erickson |
| 2011/0288400 A1 | 11/2011 | Russel |
| 2013/0289667 A1 | 10/2013 | Wacnik |
| 2014/0171779 A1 | 6/2014 | Pouratian |
| 2015/0367133 A1 * | 12/2015 | Schiff ................ A61N 1/36071 607/45 |
| 2018/0193649 A1 | 7/2018 | Schouenborg et al. |
| 2018/0360343 A1 | 12/2018 | Lee et al. |
| 2019/0359661 A1 | 11/2019 | Mohanty |
| 2020/0038674 A1 | 2/2020 | Sasha |
| 2020/0069215 A1 | 3/2020 | Bankiewicz et al. |
| 2020/0398068 A1 | 12/2020 | Agnihotri et al. |

OTHER PUBLICATIONS

Mair et al., "Cognitive Activation by Central Thalamic Stimulation: The Yerkes-Dodson Law Revisited," Dose Response 9(3):313-331 (2011).

Pedrosa et al., A Functional Micro-Electrode Mapping of Ventral Thalamus in Essential Tremor, Brain 141 (9):2644-2654 (2018).

* cited by examiner

METHODS FOR SELECTIVE ACTIVATION OF CENTRAL THALAMUS FIBERS IN A SUBJECT AND SYSTEMS THEREFOR

This application is a national stage application under 35 U.S.C. § 371 of International Application No. PCT/US2021/023648, filed Mar. 23, 2021, which claims the priority benefit of U.S. Provisional Patent Application Ser. No. 62/993,468, filed Mar. 23, 2020, which is are hereby incorporated by reference in their entirety.

This invention was made with government support under grand number R01 NS067249 awarded by National Institutes of Health-National Institute of Neurological Disorders and Stroke. The government has certain rights in the invention.

FIELD

The present technology relates to methods for selective activation of central thalamus fibers in a subject. The present technology also relates to methods, devices, and computer readable media for surgical planning for selective activation of central thalamus fibers in a subject. More specifically, the present technology relates to methods of selective activation to maximize central lateral nucleus and medial dorsal tegmental tract fiber pathway activation in the subject and to minimize central median parafascicularis fiber pathway activation in the subject.

BACKGROUND

The central thalamus (CT) is a key node in the arousal regulation network of the mammalian brain hypothesized to modulate large-scale activity patterns across the anterior forebrain in response to internal and external demands during wakefulness. Damage of the CT in humans, due to traumatic brain injury (TBI) or stroke, results in enduring cognitive deficits in the allocation of attention, maintenance of concentration and focus, working memory, impulse control, processing speed, and motivation.

As current therapeutics are not effective at treating these cognitive deficits, deep brain stimulation (DBS) within the central thalamus (CT-DBS) has been proposed as a therapeutic option to artificially restore arousal regulation in order to reestablish and/or broadly support cognitive function in TBI patients. By targeting the 'wing' of the central lateral (CL) nucleus, CT-DBS can result in a significant and cumulative improvement in a patient's responsiveness, communication, and motor function following a very severe TBI. However, the mechanisms that produce this outcome, which are dependent on DBS lead location and methods of neural activation, remain unknown.

The use of DBS to treat very severe TBI patients has a long history of failure, primarily due to poor patient selection and hypothesis-free DBS targeting. The predominant target for DBS in these patients has been the centromedian-parafascicularis complex (Cm-Pf) of the thalamus, a relatively large and prominent nucleus adjacent to the CL nucleus. Yet to date, clinical outcomes in this patient population have been highly variable due to several factors such as the etiology of patients investigated, the ability to successfully target and acquire CM-Pf during lead implantation, the background spontaneous recovery rate from TBIs within the first year following an injury.

Despite the variability in clinical results, the preclinical evidence for enhancing arousal and behavioral performance in intact animals during electrical stimulation of CL is more extensive. Recent studies confirm that electrical stimulation of CL can effectively enhance arousal and performance in healthy rodents and in two rodent models of pathology, epilepsy and TBI. In anesthetized animals, optogenetic stimulation of CL in mice and electrical stimulation of CL in rodents and non-human primates (NHP) demonstrate broad cortical and subcortical activations. A recent study in healthy behaving non-human primates (NHPs) expanded on these results, examining the effects of various methods of CT-DBS on behavior and physiology while the animals performed more complex visuomotor tasks. A unique aspect of this study was the use of two closely spaced DBS leads placed within CT and the discovery that both the precise location of the leads in CT and the orientation of the electric field established between the two leads were critical parameters for improving performance and enhancing frontostriatal activity patterns.

The present technology is related to overcoming these and other deficiencies in the art.

SUMMARY

One aspect of the present technology relates to a method for selective activation of central thalamus fibers in a subject. The method involves providing one or more electrodes each with one or more contacts. The one or more electrodes are positioned in the subject's central thalamus fibers. An electrical stimulus is applied to the positioned one or more electrodes to selectively activate the central thalamus fibers of the subject. The positioning and applying are carried out to maximize central lateral nucleus and medial dorsal tegmental tract fiber pathway activation in the subject and to minimize central median parafascicularis fiber pathway activation in the subject.

Another aspect of the present technology relates to a method of treating a condition characterized by impaired arousal regulation in a subject. The method involves selecting a subject with impaired arousal regulation. One or more electrodes are provided each with one or more contacts. The one or more electrodes are positioned in the selected subject's central thalamus fibers. An electrical stimulus is applied to the positioned one or more electrodes to treat the selected subject for impaired arousal regulation. The positioning and applying are carried out to maximize central lateral nucleus and medial dorsal tegmental tract fiber pathway activation in the selected subject and to minimize central medial parafascicularis fiber pathway activation in the selected subject.

A further aspect of the present technology relates to a method for surgical planning involving selective activation of central thalamus fibers in a subject implemented by one or more surgical planning computing devices. The method involves segmenting the central thalamus in an image of the subject's brain to produce a segmented brain model. One or more fiber pathways in the segmented brain model are modeled. Initial model electrode positions are generated in the segmented brain model. A stimulation map is produced based on the modelling and generating. A position for the one or more electrodes in the subject's central thalamus fibers and electrical stimulus conditions for the positioned one or more electrodes are identified to selectively activate the central thalamus fibers of the subject so that central lateral nucleus and medial dorsal tegmental tract fiber pathway activation in the subject is maximized and central medial parafascicularis fiber pathway activation in the subject is minimized based on the produced simulation map.

Yet another aspect of the present technology relates to a non-transitory computer readable medium having stored thereon instructions for surgical planning involving selective activation of central thalamus fibers in a subject. The non-transitory computer readable medium includes executable code that, when executed by one or more processors, causes the one or more processors to segment the central thalamus in an image of the subject's brain to produce a segmented brain model. One or more fiber pathways are modelled in the segmented brain model. Initial model electrode positions are generated in the segmented brain model. A stimulation map is produced based on the modelling and generating. A position for the one or more electrodes in the subject's central thalamus fibers and electrical stimulus conditions for the positioned one or more electrodes are identified to selectively activate the central thalamus fibers of the subject so that central lateral nucleus and medial dorsal tegmental tract fiber pathway activation in the subject is maximized and central medial parafascicularis fiber pathway activation in the subject is minimized based on the produced simulation map.

Another aspect of the present technology relates to a surgical planning computing device. The surgical planning computing device includes a non-transitory computer readable medium comprising programmed instructions stored thereon for surgical planning involving selective activation of central thalamus fibers in a subject and one or more processors coupled to the computer-readable medium and configured to execute the stored programmed instructions. The stored programmed instructions include segmenting the central thalamus in an image of the subject's brain to produce a segmented brain model. One or more fiber pathways are modelled in the segmented brain model. Initial model electrode positions are generated in the segmented brain model. A stimulation map is produced based on the modelling and generating. A position for the one or more electrodes in the subject's central thalamus fibers and electrical stimulus conditions for the positioned one or more electrodes are identified to selectively activate the central thalamus fibers of the subject so that central lateral nucleus and medial dorsal tegmental tract fiber pathway activation in the subject is maximized and central medial parafascicularis fiber pathway activation in the subject is minimized based on the produced simulation map.

A further aspect of the present technology relates to a system for selective activation of central thalamus fibers in a subject. The system includes the surgical planning computing device of the present technology. The system also includes an imaging device operationally coupled to the surgical planning system and one or more electrodes. An electrical stimulator is coupled to the surgical planning system and the one or more electrodes to permit electrical activation of the electrodes based on instructions from the surgical planning system.

The present technology advantageously provides methods of treatment and systems that enable treatment via the selective activation of structures within the central thalamus to support forebrain arousal regulation via the activation of fibers emanating from the central lateral nucleus of the central thalamus (CL) and the surrounding dorsal tegmental track medial (DTTm). The CL-DTTm target can be activated optimally by shaping the applied electrical field by utilizing one or more leads, or stimulators, with many electrode contacts.

The inventors' hypothesized that the key target for stimulation is the local fiber tracts that traverse the CT and not a single nucleus. One candidate pathway is the medial dorsal tegmental tract (DTTm), a component of the ascending reticular activating system that passes through CL and into the thalamic reticular nucleus (TRN) that in turn projects broadly to the cortex and striatum. The DTTm also carries glutamatergic efferents from the CL nucleus to the TRN, cortex, and striatum. Another candidate fiber pathway is the glutamatergic fibers emanating from Cm-Pf that project, through the TRN enroute, predominantly to the striatum. The inventors' examined how various methods of CT-DBS recruit these two intra-thalamic pathways and how their selective or combined activation may influence performance in the healthy NHP. This a priori comparison between the two pathways was chosen for two reasons: 1) in vivo studies demonstrate that these intra-thalamic pathways reciprocally inhibit rostral or caudal components of the central (or 'intralaminar') thalamic nuclei, and 2) human DBS studies suggest that behavioral facilitation may be achieved with either pathway's activation. Thus, the null hypothesis for electrical activation of the central thalamus more generally maintains that bulk activation of the two pathways might be synergistic. Here, the inventors' partially falsify this null hypothesis and show that selective activation of the DTTm produces behavioral facilitation in the healthy NHP. A precise therapeutic DBS target may be difficult to determine for many SBI patients given the presence of a wide range of structural injuries in this population including substantial deformation and atrophy of the thalamic nuclei. However, patients with higher levels of consciousness and less structural injury of their thalamus, frontal lobe, and striatum are expected to be ideal candidates for DBS therapy as they often suffer from enduring cognitive dysfunction. In such persons, however, improved targeting and activation of the arousal related pathways that minimizes OFF-target side effects, are critical to developing this potential therapy, as recently demonstrated. The inventors' further established the DTTm fiber pathway as an optimal DBS target to facilitate performance in healthy NHPs, which directly informs ongoing and future clinical studies using DBS to treat the enduring fatigue and cognitive dysfunction experienced by the majority TBI patients.

Central thalamic deep brain stimulation (CT-DBS) is an investigational therapy to treat enduring cognitive dysfunction in humans following traumatic brain injury (TBI). However, the mechanisms of CT-DBS that could promote restoration of cognitive functions are unknown and the heterogeneous etiology and recovery profiles of TBI patients will likely result in variable outcomes and will be difficult to interpret. Modes of CT-DBS activation of the central thalamus (CT) in healthy non-human primates (NHP) were modeled and experimentally validated as the NHPs performed various visuomotor tasks. Selective activation of a specific fiber pathway, the DTTm and limited activation of the adjacent centromedian-parafascicularis (Cm-Pf) pathway, results in robust behavioral facilitation. The modeling of CT-DBS within these two adjacent thalamic pathways is concordant with the behavioral effects observed across animals. The empirical validation of the biophysical modeling approach in intact behaving NHPs directly informs ongoing and future clinical investigations using conventional and novel modes of CT-DBS in TBI patients to effectively treat the enduring cognitive dysfunction experienced by the vast majority of these people, for whom no therapy currently exists.

Both CL and Cm-Pf have been reported to be associated with some improved arousal and facilitation of behavior, although the quality of localization in human clinical studies varies making direct comparisons indeterminate. The selective effect of CL-DTTm fibers demonstrated here is consistent with these projections providing a broad excitatory input across frontal cortical and striatal regions. That limited co-activation of the Cm-Pf→TRN fibers limited facilitation, and equal co-activation of these fibers had a suppressive effect, implicates a key role for known anatomical and physiological distinctions between CL neurons and those within the parafascularis (Pf) and centromedian (Cm) nuclei.

Studies of both cortical and striatal activation demonstrate a foundation for the selective behavioral effects associated with CL-DTTm activation. CL-DTTm achieves a very broad activation across frontal cortical (Baker, et al., "Robust Modulation of Arousal Regulation, Performance and Frontostriatal Activity Through Central Thalamic Deep Brain Stimulation in Healthy Non-Human Primates." *J. Neurophysiol.* 116:2383-2404 (2016), the disclosure of which is incorporated by reference herein in its entirety) and striatal regions (Liu, et al., "Frequency-Selective Control of Cortical and Subcortical Networks by Central Thalamus. *Elife.* 4, 1-27 (2015), the disclosure of which is incorporated herein by reference in its entirety) whereas the local microcircuit effects of CL-DTTm and Cm-Pf stimulation within the striatum are distinct. Medium spiny neurons (MSN), the principal output neurons of the striatum, are activated by either CL or Pf afferents but it has been shown that CL afferents are more effective in driving MSN action potentials. Pf afferents, on the other hand, act via NMDA receptors and generate long-term depression through mechanisms of synaptic plasticity (Ellender, et al., "Heterogeneous Properties of Central Lateral and Parafascicular Thalamic Synapses in the Striatum." *J. Physiol.* 591, 257-72 (2013), the disclosure of which is incorporated by reference herein in its entirety). These physiological distinctions likely contribute to the reduction of behavioral facilitation that is produced when CL-DTTm and Cm-Pf→TRN fibers are co-activated.

Increased feedback inhibition from the TRN on CL, due to the addition of Cm-Pf→TRN activation, may also contribute to the drop in CL's excitatory effects of frontal lobe function when both pathways are stimulated. Within the neocortex the broad innervation of supragranular and infragranular layers by CL afferents is associated with supralinear summation of effects across cortical columns (Llinás, et al., "Temporal Binding Via Cortical Coincidence Detection of Specific and Nonspecific Thalamocortical Inputs: A Voltage-Dependent Dye-Imaging Study in Mouse Brain Slices." *Proc. Natl. Acad. Sci. U. S.* 816 A. 99, 449-454 (2002), the disclosure of which is incorporated herein by reference in its entirety). It is likely the encroachment of activation on Cm-Pf that reduces this selective activation through both local synaptic effects within the striatum (where Cm and Pf innervations are patchy as disclosed in Smith, et al., "The Thalamostriatal Systems: Anatomical and Functional Organization in Normal and Parkinsonian States." *Brain Res. Bull.* 78, 60-68 (2009) and Ellender, et al., "Heterogeneous Properties of Central Lateral and Parafascicular Thalamic Synapses in the Striatum." *J. Physiol.* 591, 257-72 (2013), the disclosures of which are incorporated by reference herein in their entirety) and powerful inhibition of cell bodies within parts of CL (and paralaminar thalamic regions (Jones, *The Thalamus* Springer US, Boston, MA, ed. 2nd, (2007) and Münkle, et al., "The Distribution of Calbindin, Calretinin and Parvalbumin Immunoreactivity in the Human Thalamus." *J. Chem. Neuroanat.* 19, 155-173 (2000), the disclosure of which is incorporated by reference herein in their entirety) through feedback inhibition from the TRN (Crabtree, et al., "New Intrathalamic Pathways Allowing Modality-Related and Cross Modality Switching in the Dorsal Thalamus." *J. Neurosci.* 22, 8754-8761 (2002)., the disclosure of which is incorporated by reference herein in its entirety).

BRIEF DESCRIPTION OF THE DRAWINGS

FIG. 10A shows post-operative localization of the three DBS leads in the right thalamus of NHP3, with axial (left) and coronal (right) views. The computed tomography artifact of the DBS lead contacts, see insets with individual contact, is fused with the macaque MRI atlas and overlaid with segmentations of the thalamic reticular nucleus (TRN). FIG. 10B shows reconstruction of the lead locations for the three NHP subjects in the sagittal (left), axial (middle), and coronal (right) planes, along with the thalamic nuclei in A and the two predominant fiber pathways.

FIG. 11A shows the performance estimate of NHP1 on the visuomotor reaction time task is shown in the upper plot as a smoothly varying black line across consecutive trials. The lower plot shows the reaction times of correctly performed trials. FIG. 11B shows the performance estimate for NHP2. FIG. 11C shows the performance estimate for NHP3. FIG. 11D illustrates a reconstruction of the lead locations for each NHP shown in the sagittal plane, along with the CL, CM and TRN nuclei and the fibers of the DTTm. The anode (+) and cathode (−) field shaping configurations are shown for each.

FIG. 12A shows stimulation configurations across the three animals grouped by the configurations that had a positive effect on performance (left), no effect (middle), and a negative effect (right) and box plots showing 224 the distribution of log odds ratio (LOR) changes. Each configuration group has significantly different effects on performance compared to the other two groups, with a two-tailed t-test and all p-values <0.001. FIG. 12B shows the normalized occurrence of significant increases, significant decreases, and no significant change for the same three configurations groups determined by the significance of the LOR score at an a level of 0.05. Configurations in the positive effect group predominantly show significant increases in performance with no occurrence of significant decreases whereas configurations in the negative effect group predominantly show the opposite.

FIG. 13A shows the combined lead locations of all three NHPs in one coronal image and two predominant fiber pathways. FIG. 13B shows stimulation configurations across all animals grouped by those that had a positive effect on performance (left), no effect (middle), and a negative effect (right) and the normalized percentage of how many configurations in that group activated the fibers in each pathway. 100% means that every configuration in the effect group activated that specific fiber, and 0% means that no configuration in that group activated that specific fiber. Nearly every stimulation configuration in the positive effect group activates nearly every fiber in the DTTm while activating minimal Cm-Pf fibers. The no effect group and the negative effect groups had reduced percentages of configuration activation of the DTTm and increasing activation of the Cm-Pf fibers.

FIG. 14A shows anode-cathode configurations that resulted in positive behavioral effects show decreased log odds ratios as the current exceeds 2 mA. This decline in performance coincides with increased Cm-Pf fiber activation. FIG. 14B shows lead locations and a numbering scheme of the active contacts for NHP3 positioned within the DTTm target and anteromedially to the Cm-Pf fibers. FIG. 14C shows fiber activation profiles for the DTTm and Cm-Pf fibers for three configurations in NHP 3 in which the standard monopolar (2-C+) and bipolar (2-3+) each show early activation of Cm-Pf fibers. These two configurations were not effective in facilitating behavioral performance despite the cathodic contact being in prime position to activate the DTTm. The third configuration, which utilizes field shaping across multiple leads (2-14+), was one of the most effective configurations because it provided a larger working range of amplitudes that activated the target DTTm before spreading into the Cm-Pf pathway.

DETAILED DESCRIPTION

The present technology relates to methods for selective activation of central thalamus fibers in a subject. The present technology also relates to methods, devices, and computer readable media for surgical planning for selective activation of central thalamus fibers in a subject. More specifically, the present technology relates to methods of selective activation to maximize central lateral nucleus and medial dorsal tegmental tract fiber pathway activation in the subject and to minimize central median parafascicularis fiber pathway activation in the subject.

Devices and Systems

Devices and systems for carrying out selective activation of central thalamus fibers in a subject, including a surgical planning computing device, are described herein.

One aspect of the present technology relates to a system for selective activation of central thalamus fibers in a subject. The system includes a surgical planning computing device of the present technology. The system also includes an imaging device operationally coupled to the surgical planning computing device and one or more electrodes. An electrical stimulator is coupled to the surgical planning computing device and the one or more electrodes to permit electrical activation of the electrodes based on instructions from the surgical planning computing device.

Figure 1:
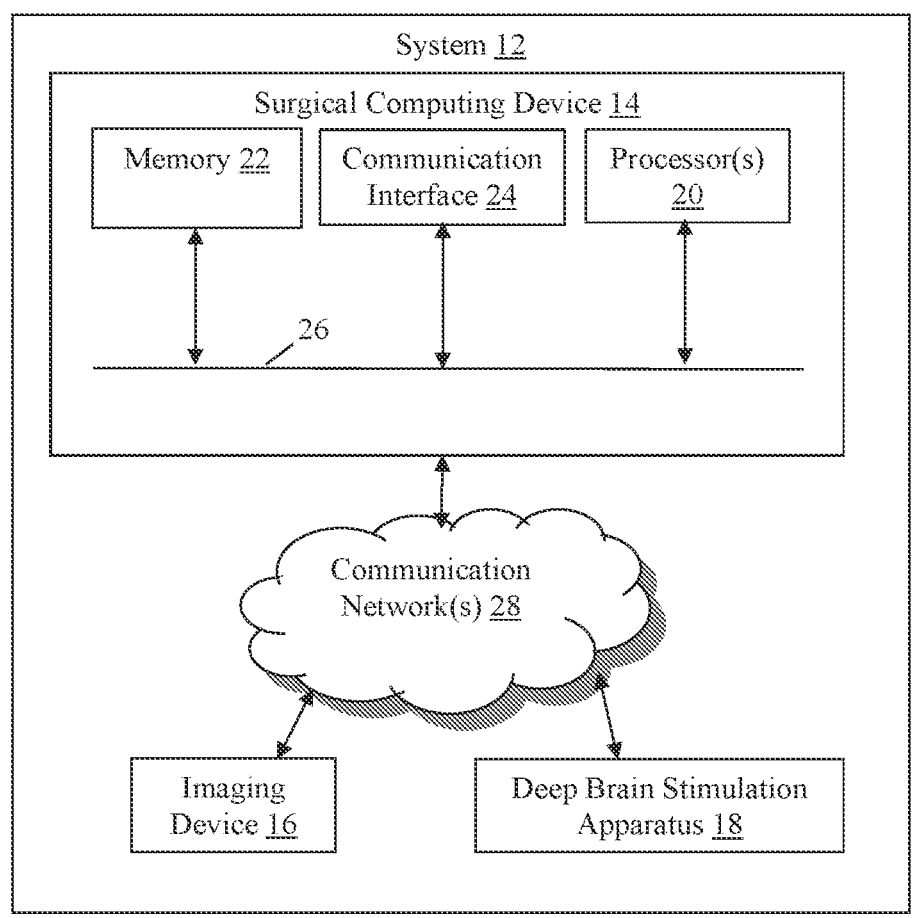
FIG. 1 is a block diagram of an exemplary system of the present technology for selective activation of central thalamus fibers in a subject including a surgical planning computing device.

FIG. 1 illustrates an environment 10 including system 12 for selective activation of central thalamus fibers in a subject. System 10 includes surgical planning computing device 14, imaging device 16, and deep brain stimulation apparatus 18, although system 10 may include other elements or components in other combinations, such as additional computing devices. System 12 enables treatment via the selective activation of structures within the central thalamus to support forebrain arousal regulation via the activation of fibers emanating from the central lateral nucleus of the central thalamus (CL) and the surrounding dorsal tegmental track medial (DTTm).

Surgical planning computing device 14 of system 12 includes one or more processor(s) 20, memory 22, and communication interface 24 that are coupled together by a bus 26 or other communication link, although surgical planning computing device 14 can include other types and/or numbers of elements in other configurations.

Processor(s) 20 of surgical planning computing device 14 may execute programmed instructions stored in memory 22 for any number of the functions or other operations illustrated and described by way of the examples herein, including surgical planning for selective activation of central thalamus fibers in a subject. Processor(s) 20 of surgical planning computing device 14 may include one or more graphic processing units (GPUs), CPUs, or general processors with one or more processing cores, for example, although other types of processor(s) can be used.

Memory 22 of surgical planning computing device 14 stores the programmed instructions for one or more aspects of the present technology as illustrated and described herein, although some or all of the programmed instructions could be stored elsewhere. A variety of different types of memory storage devices, such as random access memory (RAM), read only memory (ROM), hard disk drive (HDD), solid state drives (SSD), flash memory, or other computer readable medium that is read from and written to by a magnetic, optical, or other reading and writing system that is coupled to processor(s) 20 can be used for memory 22.

Accordingly, memory 22 of surgical planning computing 14 device can store application(s) that can include executable instructions that, when executed by surgical planning computing device 14, cause surgical planning computing device 14 to perform actions, such as to perform methods for surgical planning for selective activation of central thalamus fibers in a subject as illustrated and described by way of the examples herein, such as in FIG. 6. The application(s) can be implemented as modules or components of other application(s). Further, the application(s) can be implemented as operating system extensions, modules, plugins, or the like.

Communication interface 24 of surgical planning computing device 14 operatively couples and allows for communication between surgical planning computing device 14, imaging device 16, and deep brain stimulation apparatus 18, which are all coupled together by one or more communication network(s) 28, although other types and/or numbers of connections and/or configurations to other device and/or elements can be used. Communication network(s) 28 can include any number and/or types of communication networks, such as local area network(s) (LAN(s)) or wide area network(s) (WAN(s)), and/or wireless networks, although other types and/or number of protocols and/or communication network(s) can be used.

Although embodiments of surgical planning computing device 14 are described and illustrated herein, surgical planning computing device 14 can be implemented on any suitable computing system or computing device. It is to be understood that the devices and systems described herein are for exemplary purposes and many variations of the specific hardware and software are possible, as will be appreciated by those skilled in the relevant art(s).

Alternatively, each of the systems may be conveniently implemented using one or more general purpose computer systems, microprocessors, digital signal processors, and micro-controllers, programmed according to the teachings described and illustrated herein. For example, the processor can be an Intel Core Duo® processor provided by Intel Corporation of Santa Clara, Calif.

In addition, two or more computing systems or devices can be substituted for any one of the systems described above. Accordingly, principles and advantages of distributed processing, such as redundancy and replication, also can be implemented, as desired, to increase the robustness and performance of the devices and systems described above. The embodiments of the present application may also be implemented on a computer system or systems that extend across any suitable network using any suitable interface mechanisms and communications technologies, including, by way of example only, telecommunications in any suitable form (e.g., voice and modem), wireless communications media, wireless communications networks, cellular communications networks, G3 communications networks, Public Switched Telephone Networks (PSTNs), Packet Data Networks (PDNs), the Internet, intranets, and combinations thereof.

Imaging device 16 may be any suitable imaging device to obtain images of the subject's brain, including devices suitable for computed tomography imaging, although other appropriate imaging devices may be employed. Imaging devices 16 is coupled to surgical planning computing device 14 to provide images of the subject's brain for further analysis in accordance with the methods disclosed herein.

Figure 2:
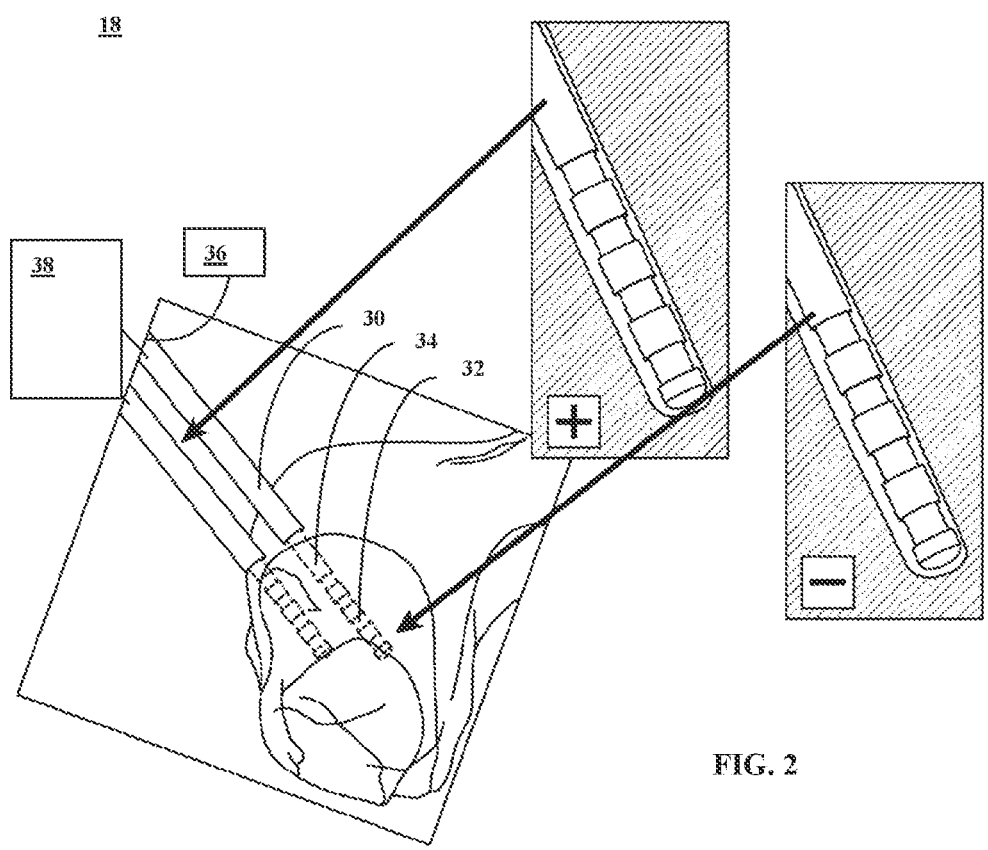
FIG. 2 is a partial side view and partial block diagram of an exemplary deep brain stimulation apparatus of the present technology.

FIG. 2 is a perspective view and functional block diagram of deep brain stimulation apparatus 18. Deep brain stimulation apparatus 18 includes first and second stimulators 30 coupled to stimulus signal generator 32. Although deep brain stimulation apparatus 18 is described with respect to first and second stimulators 30, it is to be understood that deep brain stimulus apparatus 18 may include additional stimulators. Further, although deep brain stimulation apparatus 18 is described, it is to be understood that other types of stimulation devices could be employed in the methods of the present technology including stimulation devices that employ other energy modalities.

First and second stimulators 30 include at least one electrode 32 mounted on shank 34. In one embodiment, more than one electrode 32 is mounted on shank 34 such that stimulator 30 is a "multipolar electrode," with each electrode separately controllable. In this example, four electrodes 32 are located on each shank 34 to provide a plurality of spaced contacts, although other numbers of electrodes may be utilized. Electrodes 34 are connected to one (or separate) insulated conductor(s) which passes through shank 34. The insulated conductor connects electrodes 32 to voltage control 36 and stimulus signal generator 38. Voltage control 36 and stimulus signal generator 38 may be separate from one another or part of a single unit. The connections mentioned herein may be wired or wireless.

Electrodes 32 are made from a conducting material, which may be an alloy such as platinum/iridium, with impedances known in the art, for example, between approximately of 100 and 150 kΩ. Electrodes 32 are approximately 0.5 mm in length. In one embodiment, where multiple electrodes 32 are mounted on shank 34, the separation between electrodes 32 may be variable or constant, and may be approximately 0.5 mm.

Shank 34 is configured to be implanted in the brain of the subject. Shank 34 may be configured as a cylinder, a square, a helix, or any other geometry known in the art as suitable for implementation. In one embodiment, shank 34 is implanted in the central thalamus of the subject for selective activation of central thalamus fibers in the subject, as described herein.

Stimulus signal generator 38 produces a selected pulse train. In one embodiment, stimulus signal generator 38 is capable of separately driving individual electrodes 32 in a multi-electrode system through various channels. In this example, signal pulse generator 38 may operatively select any one of electrodes 32 to provide a stimulus signal. Signal pulse generator 38 may provide stimulation with various parameters, such as frequency or waveform, across multiple electrodes 32 simultaneously, and independently.

Signal pulse generator 38 is capable of generating voltage wave trains of any desired form (monophasic or biphasic sine, square wave, spike, rectangular, triangular, ramp, etc.) in a selectable voltage amplitude in the range from about 0.1 volts to about 10.5 volts or from about 0.1 mA to about 25.0 mA and at selectable frequencies in the range from about 1 Hz to about 10 kHz. In one embodiment, stimulus signal generator 38 is capable of generating constant current across at least one pair of electrodes 30 with either electrode in the pair assigned as a cathode or anode, although stimulus signal generator 38 may generate a constant current across two pairs of electrodes, across four pairs of electrodes, or across six pairs of electrodes, where either electrode in a pair can be assigned as a cathode or an anode. The compliance voltage of stimulus signal generator 38 is able to handle resistive loads across any pair of electrodes in the range from 0.5 kOhm to 10 kOhm. Each channel (cathode/anode pair) is able to deliver up to about 25.0 mA.

Stimulus signal generator 38 includes circuitry that allows for monitoring of the current delivered across each channel. In one embodiment, stimulus signal generator 38 is programmable in that pulse shapes, sequences, and frequencies of pulses can be designed by software on a computer, such as surgical planning computing device 14, and uploaded to stimulus signal generator 38 for delivery to electrodes 32 upon command. The cathode-anode outputs from each channel may be used to provide bipolar constant-current stimulation in the intralaminar nuclei through any pair of electrode contacts across implanted stimulators 30.

Voltage control 36 provides a selected current amplitude or voltage to the waves of the pulse train. In practice, the pulse train and voltage amplitudes employed will be selected on a trial and error basis by evaluating a subject's response to various types and amplitudes of electrical stimulation over a time course of from about 1 to about 12 months. For example, after implanting stimulators 30 in the subject's thalamic nuclei, stimulation with a voltage within the range of from about 0.1 to about 10.5 volts or higher at a rate within the range of from about 1 Hz to about 10 kHz, is applied for from about 8 to about 12 hours a day. The voltage control 36 may provide continuous, periodic, or intermittent stimulation. In one embodiment, voltage control 36 provides an electrical stimulus that is carried out using one or more stimulation programs that are capable of being interleaved in time.

Figure 3A:
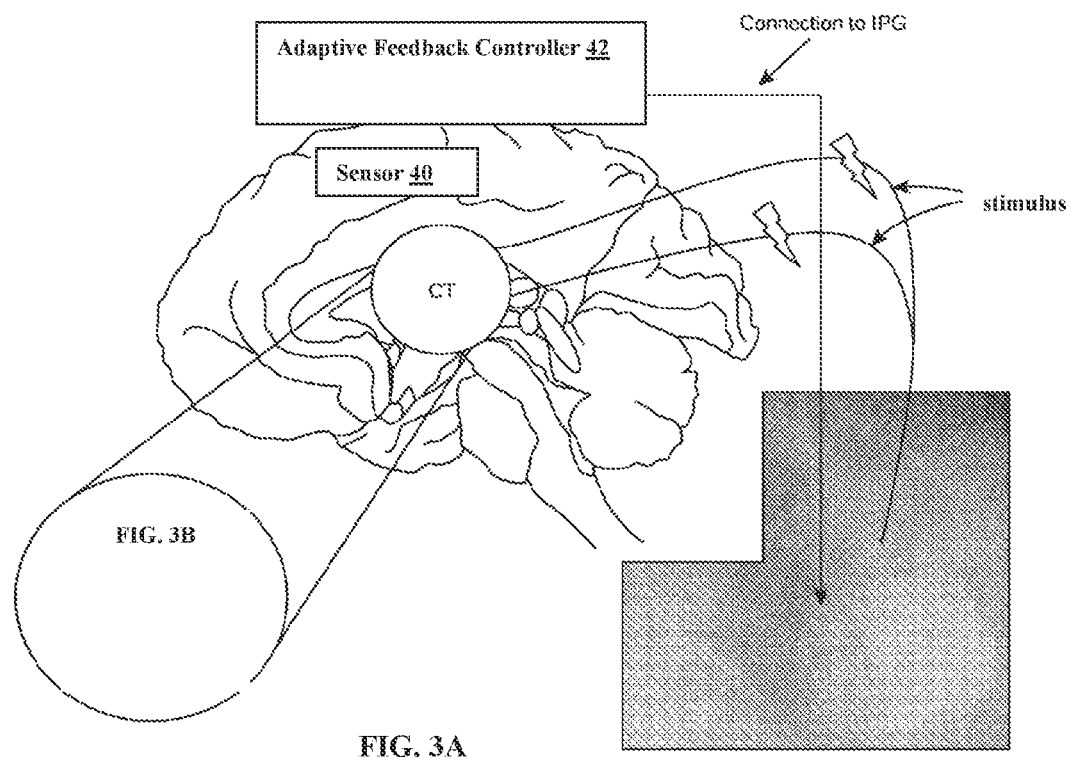
FIG. 3A is a partial side view and partial block diagram of one embodiment of a deep brain stimulation apparatus of the present technology implanted in a brain.
Figure 3B:
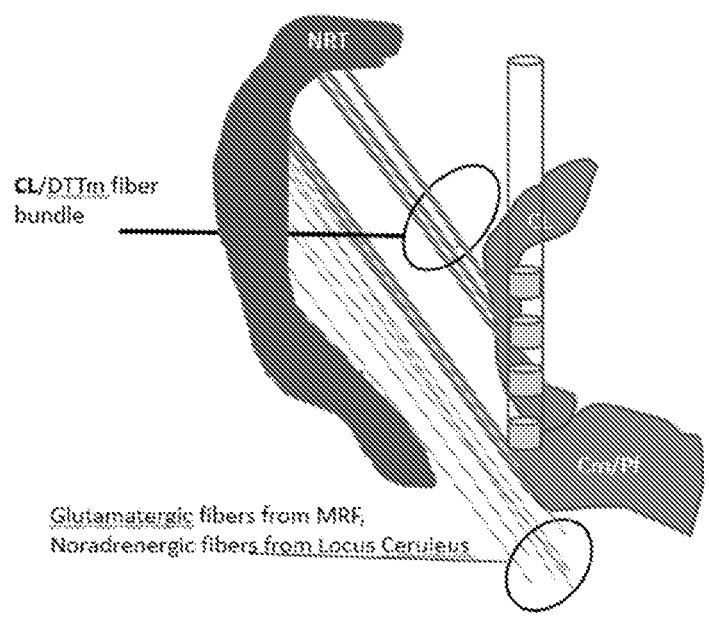
FIG. 3B is a perspective view of a portion of the deep brain stimulation apparatus implanted as shown in FIG. 3A to provide selective activation of central thalamus fibers in a subject.

Referring now to FIGS. 3A and 3B, in one embodiment, deep brain stimulation apparatus 18 includes one or more sensors 40 connected to adaptive feedback controller 42. Sensors 40 are configured to detect neuronal activity of one or more cortical and/or subcortical tissues of a selected subject's brain, by means known in the art, although electrodes 32 may be utilized to detect neuronal activity. In one embodiment, sensors 40 are incorporated into stimulators 30, although sensors 40 not incorporated into a stimulator, referred to herein as "extra-stimulator sensors" may be utilized. The extra-stimulator sensors may be implanted within cortical or subcortical regions or may be located on the scalp surface of the patient's head. Sensors 40 collect neuronal data in the form of, for example, single-unit activity, local field potentials, and/or electrocorticogram ("EcoG") activity. Connections between sensor 40 and brain tissue may be electrical, electromagnetic (wireless), or optical to one or many targets to be determined by availability and involvement in specific patterns of brain injury.

In one embodiment, sensors 40 include computer and logic circuitry, although computer and logic circuitry associated with sensors 40 may be distributed among other components, such as incorporated into adaptive feedback controller 42, or in the stimulus signal generator 38, and/or one or more other devices, which may be implanted in the patient or external to the patient. In one embodiment, cortical placement of sensors 40 can detect the occurrence of failures of human control and adaptive feedback 42 controller can adjust stimulation of thalamic targets in synchronism with the processes occurring in deep brain stimulation apparatus 18.

Figure 4:
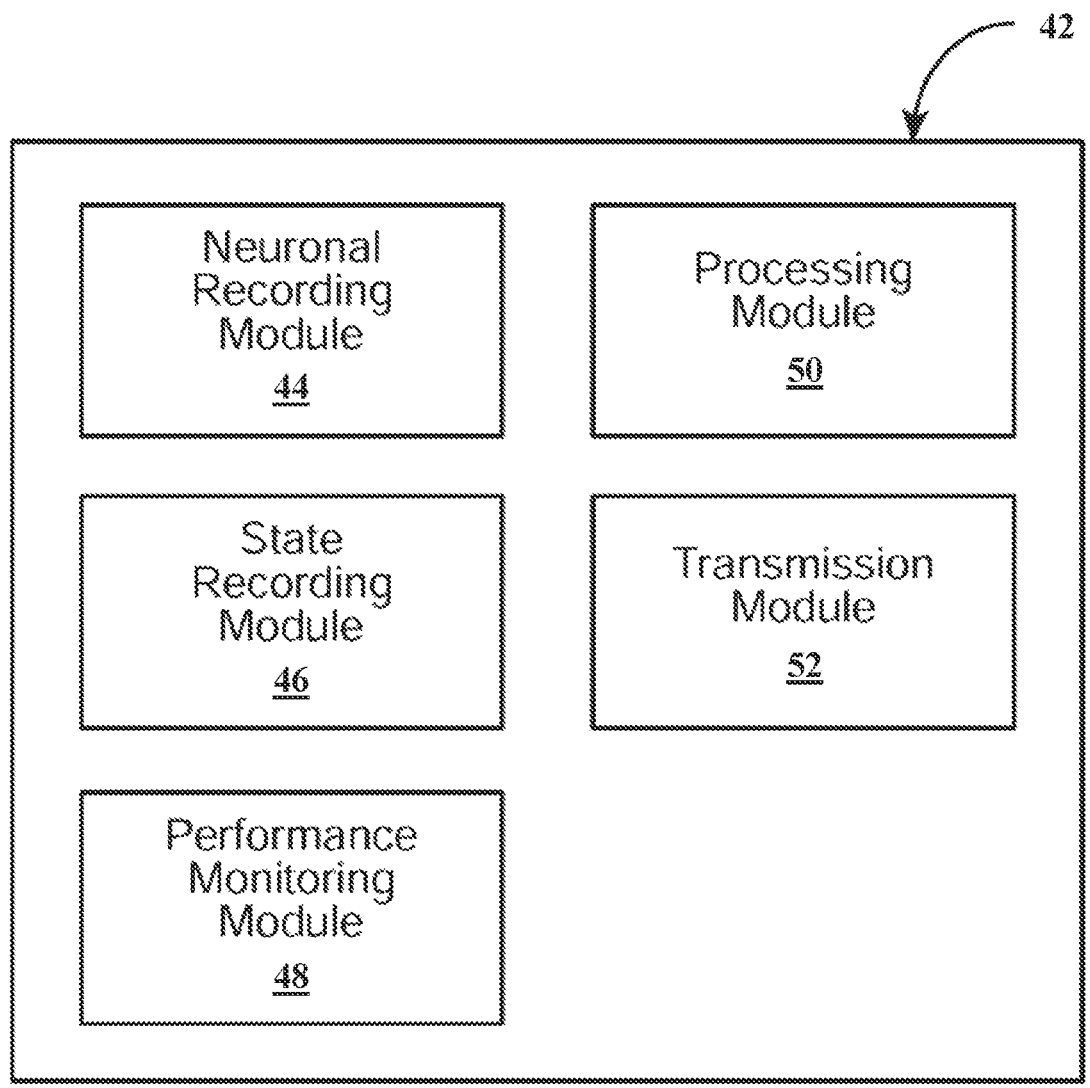
FIG. 4 is a block diagram of the adaptive feedback controller illustrated in FIG. 3A.

Referring now to FIGS. 3A, 3B, and 4, in one embodiment, adaptive feedback controller 42 includes neuronal recording module 44, state monitoring module 46, performance monitoring module 48, processing module 50, and transmission module 52. The modules described here for adaptive feedback controller 42 may be located within one physical device or may be distributed among multiple devices, including surgical planning computing device 14, and may be incorporated with other components or devices described herein. For example and without limitation, neuronal recording module 44 may be located in the same device as an extra-stimulator sensor and said device will have appropriate transmission pathways to receive and send information from and to other components of deep brain stimulation apparatus 18, the patient, and/or external systems used to maintain, control, or inspect deep brain stimulation apparatus 18 or the patient, including surgical planning computing device 14.

Neuronal recording module 44 receives and stores various items of information from sensors 40, such as electrical waveform pattern data unique to the patient. In one embodiment, neuronal recording module 44 stores information received from sensors 40 in real time when deep brain stimulation apparatus 18 is being used. In one embodiment, neuronal recording module 44 includes output means to allow retrieval of signals stored during an off-line operation of deep brain stimulation apparatus 18.

State monitoring module 46 is coupled to sensors 40, and is configured to store and process a first set of variables associated with a state of the detected neuronal activity, particularly the spectral content of the local neuronal activity and in particular, the total power within the frequency ranges 10-15 Hz, 15-20 Hz, 20-25 Hz, 25-30 Hz, 10-30 Hz which have all been empirically identified to increase within neuronal populations of the cortex, basal ganglia, and thalamus during either effective multi-site stimulation or during alert cognitive function. State monitoring module 46 may be used to sample the average characteristics of neuronal activity over time from sensors 40 or outside of the brain that collect neuronal signals for this purpose and to provide as feedback the real-time characteristics of the signals via direct or wireless (Bluetooth) connections. In one embodiment, state monitoring module 46 includes an internal memory and computational resources to extract signal features of the neuronal signal.

Performance monitoring module 48 is coupled to sensors 40 and is configured to store and process a second set of variables associated with modulation of the frequency of the locally detected neuronal activity. Performance monitoring module 48 is used to monitor the performance characteristics of the stimulation in producing increases in spectral power of local populations at pre-specified frequency ranges (e.g., 15-25 Hz). In one embodiment, performance monitoring module 48 includes an internal memory and computational resources to extract signal features of the neuronal signal.

Processing module 50 is coupled to state monitoring module 46 and performance monitoring module 48. In one embodiment, processing module 50 is configured to extract a feature vector based upon the processed first and second set of variables, and may be configured to compute an optimal response stimulus signal based upon a comparison between the extracted feature vector and a pre-stored feature vector corresponding to the local spectrum of neuronal activity for the subject recording sites.

Transmission module 52 is configured to transmit the optimal response stimulus signal computed by the processing module 50 to the implanted stimulus signal generator 38 to regulate the arousal level neuronal activity of the patient.

Based upon respective sets of variables stored and/or measured, performance monitoring module 48 and state monitoring module 46 may be used to extract a feature vector from the variables using computer and logic circuitry. Feature vectors represent an approximately complete mathematical description of electrical signals resulting from neuronal activity. Computed feature vectors can be used for further processing and to synthesize a feedback signal if necessary. A feedback signal can be outputted via a transmission path, which may be wired, wireless, or optical as known to one skilled in the art. The same or a separate component of deep brain stimulation apparatus 18 computes an output signal and transmits it to stimulator 30 placed within the brain to regulate their output in response to ongoing analysis provided by internal monitoring systems.

Referring again to FIGS. 3A and 4, an embodiment of the present application wherein the deep brain stimulation apparatus 18 includes sensors 40 that are interfaced to adaptive feedback controller 42, which in turn is interfaced to stimulus signal generator 38 is shown. Stimulus signal generator 38 is configured to provide feedback control of electrical stimulation of the targeted brain regions, for example, the central lateral nucleus and medial dorsal tegmental tract fiber pathways. Upon receipt of a signal via a transmission path, which may be wired, wireless, or optical, stimulus signal generator 38 provides a corresponding stimulus to these regions of the brain via at least one of stimulators 12 to modulate or maintain the arousal state of a subject. The operating characteristics of deep brain stimulation apparatus 18 may be adjusted automatically using adaptive feedback controller 42. In other embodiments, sensor 40 or components of adaptive feedback controller 42 may store information for retrieval by an external system or by a physician, or may be used by a physician/programmer to adjust deep brain stimulation apparatus 18 settings. Settings may be adjusted by the apparatus itself or by an external physician/programmer to raise a level of arousal, or impact on local signal power.

Methods of Treatment

One aspect of the present technology relates to a method for selective activation of central thalamus fibers in a subject. The method involves providing one or more electrodes each with one or more contacts. The one or more electrodes are positioned in the subject's central thalamus fibers. An electrical stimulus is applied to the positioned one or more electrodes to selectively activate the central thalamus fibers of the subject. The positioning and applying are carried out to maximize central lateral nucleus and medial dorsal tegmental tract fiber pathway activation in the subject and to minimize central median parafascicularis fiber pathway activation in the subject.

In a first step, one or more electrodes each with one or more contacts are provided. In one embodiment, deep brain stimulator apparatus 18 with electrodes 32 may be employed, although other devices for activation of the subject's central thalamus may employed such as a fiberoptic-optogenetic ("FOG") system, BION system, or ultrasound. The one or more electrodes are configured to provide for selective activation of the central thalmus fibers of the subject as described below. The present technology may be employed with single lead systems with multiple electrical contacts, single lead systems with multiple split contacts, and multiple lead systems with any combination of multi-contact electrodes including split band contacts. Importantly, the system will be capable of addressing any combination of anodes and cathodes across lead(s) contacts.

Figure 5:
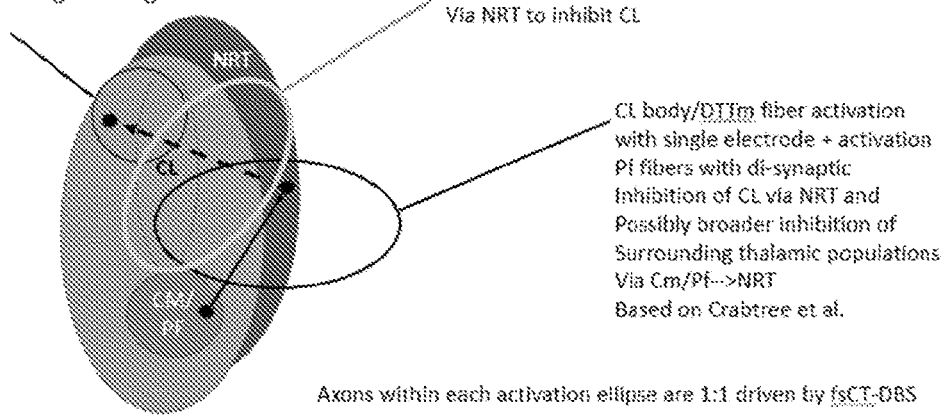
FIG. 5 is an illustration of zones of selective activation and suppression of central thalamus fibers.

Next, the one or more electrodes, such as electrodes 32 are positioned in the subject's central thalamus fibers. In one embodiment, once a relevant subject is selected, stimulator 30, as described above, is implanted in the subject's central thalamus as illustrated in FIG. 3B to maximize central lateral nucleus and medial dorsal tegmental tract fiber pathway activation in the subject and to minimize central medial parafascicularis fiber pathway activation in the subject. The zones of activation and suppression are illustrated in FIG. 5. As discussed above, stimulator 30 includes one or more electrodes 32. In some embodiments, a plurality of electrodes 32 are provided. One or more electrodes 32 have a plurality of spaced contacts. The CL-DTTm target can be activated optimally by shaping the applied electrical field by utilizing first and second stimulators 12, with many electrode 32 contacts as described below. As shown, this is achieved by positioning the most of electrodes 32 on stimulator 30 to be in contact with the central lateral nucleus and medial dorsal tegmental tract fibers while few if any of electrodes 32 on stimulator 30 are in contact with the central median parafascicularis fibers.

To carry out the above methods, a subject may be conscious with application of local anesthesia or mild sedation. In cases where a subject is not sufficiently cooperative to remain conscious during the procedure, the above-described approach can be modified in ways known in the art, to allow the operation to be completed under general anesthesia.

Subjects may include any animal, including a human. Non-human animals includes all vertebrates, e.g., mammals and non-mammals, such as non-human primates, sheep, dogs, cats, cows, horses, chickens, amphibians, and reptiles, although mammals are preferred, such as non-human primates, sheep, dogs, cats, cows and horses. The subject may also be livestock such as, cattle, swine, sheep, poultry, and horses, or pets, such as dogs and cats.

The methods described herein can be employed for subjects of any species, gender, age, ethnic population, or genotype. Accordingly, the term subject includes males and females, and it includes elderly, adult-to-elderly transition age subjects adults, pre-adult-to-adult transition age subjects, and pre-adults, including adolescents, children, and infants. In one embodiment, subjects are adult subjects in their twenties to forties, who have the most to gain from treatment and represent the greatest cost to society if left untreated. Examples of human ethnic populations include Caucasians, Asians, Hispanics, Africans, African Americans, Native Americans, Semites, and Pacific Islanders. The term subject also includes subjects of any genotype or phenotype as long as they are in need of the treatment as described herein. In addition, the subject can have the genotype or phenotype for any hair color, eye color, skin color or any combination thereof. The term subject includes a subject of any body height, body weight, or any organ or body part size or shape In one embodiment, stimulator 30 is introduced via burr holes in the skull, although in other examples multiple stimulators may be employed. Generally, prior to the introduction of stimulators 30, a detailed mapping with microelectrode and microstimulation following standard methods is carried out as described in Tasker et al., "The Role of the Thalamus in Functional Neurosurgery," Neurosurgery Clinics of North America 6(1):73-104 (1995), which is incorporated herein by reference in its entirety. Imaging device 16 may be employed to image the subject's brain. The system will enable the user to plan an implantation of a stimulation system, such as stimulator 30, in an individual subject using the neuroimaging data from imaging device 16.

The imaging data is employed to model thalamic nuclei, white matter fiber tracts and connections, and the impact of electrical field activation within the thalamus by directly modeling the relative activation of CL-DTTm→TRN, Cm-Pf→TRN, and other adjacent thalamic pathways. The present technology enables the biophysical modeling of the precise placement of a single or multiple lead system to selectively activate CL-DTTm and avoid co-activation of the Cm-Pf fiber bundle. This system includes modeling of thalamic nuclei, modeling of specific white matter fiber pathways within the brain, bioelectric field modeling, and probabilistic mapping of target activation and target avoidance achieved with varying configurations of lead contact arrangements, cathode and anode geometries, pulse shapes, pulse widths, and frequencies of stimulation.

In one aspect, a segmented brain model of the subject's central thalamus may be produced using known techniques. Model electrode positions and electrical stimulation conditions may be identified using the segmented brain model that will maximize central lateral nucleus and medial dorsal tegmental tract fiber pathway activation in the subject, while minimizing the central medial parafascicularis fiber pathway activation in the subject, as shown for example in FIGS. 3B and 6A-D. A stimulation map is produced based on the identified electrode positions and electrical stimulation conditions. The stimulation map may then be employed to carry out the actual positioning of the system, such as stimulator 30. The stimulation map, in some examples, may also be used to determine the applying of stimulation, as described further below.

Next, an electrical stimulus is applied to the positioned one or more electrodes 32 to selectively activate the central thalamus fibers of the subject. The electrical stimulus may be carried out in various conditions to maximize central lateral nucleus and medial dorsal tegmental tract fiber pathway activation in the subject and to minimize central medial parafascicularis fiber pathway activation in the subject. For example, the electrical stimulus may be applied between. 1 to 25.0 milliamps or 0.1 to 10.5 volts, selected independently for each electrode. The electrical stimulus may be applied using continuous, intermittent or periodic stimulation. The electrical stimulus may be applied using substantially in-phase or substantially out-of-phase stimulation on each electrode 32. The electrical stimulus can be configured to be ramped up or down at different rates of speed to improve the selective activation. The electrical stimulus is carried out using voltage wave trains having a monophasic or biphasic sine, square, spike, rectangular, triangular or ramp configurations. The electrical stimulus can be applied at one or more frequencies of from 1 Hz to 10 kHz. Further, the electrical stimulus can be carried out using one or more stimulation programs that are capable of being interleaved in time. The zones of activation and suppression are illustrated in FIG. 5.

The devices and systems of the present technology allow for the precise placement of single or multiple leads to selectively activate CL-DTTm fibers and minimize adjacent OFF-target fibers originating and passing through the centromedian-parafascicularis nucleus complex (Cm-Pf) that also project to the thalamic reticular nucleus (TRN), such as shown in FIG. 3B. The one or more electrodes 32 are positioned to maximize central lateral nucleus and medial dorsal tegmental tract fiber pathway activation in the subject and to minimize central median parafascicularis fiber pathway activation in the subject as shown in FIG. 5.

The present technology specifies the geometric requirements for selective activation of CL-DTTm to facilitate cognitively mediated behaviors (including but not limited to executive functions, vigilance, sustained attention, working memory, decision-making, and motor executive functions (e.g. controlled hand and arm movements). The primary effect of selective CL-DTTm stimulation is activation of neuronal populations across frontal cortical structures and the striatum, while minimizing OFF-target effects. Other cortical structures such as posterior parietal cortices and primary sensory cortices are additional direct targets of CL-DTTm activation based on known anatomical and physiological demonstrations. In one embodiment, 75% to 100% of the medial dorsal tegmental tract fibers in the central thalamus of the subject are stimulated and less than 25% of the central medial parafascicularis fibers in the central thalamus of the subject are stimulated. In another embodiment, 90% to 100% of the medial dorsal tegmental tract fibers in the central thalamus of the subject are stimulated and less than 10% of the central median parafascicularis fibers in the central thalamus of the subject are stimulated.

Figures 6A, 6B, 6C, 6D:
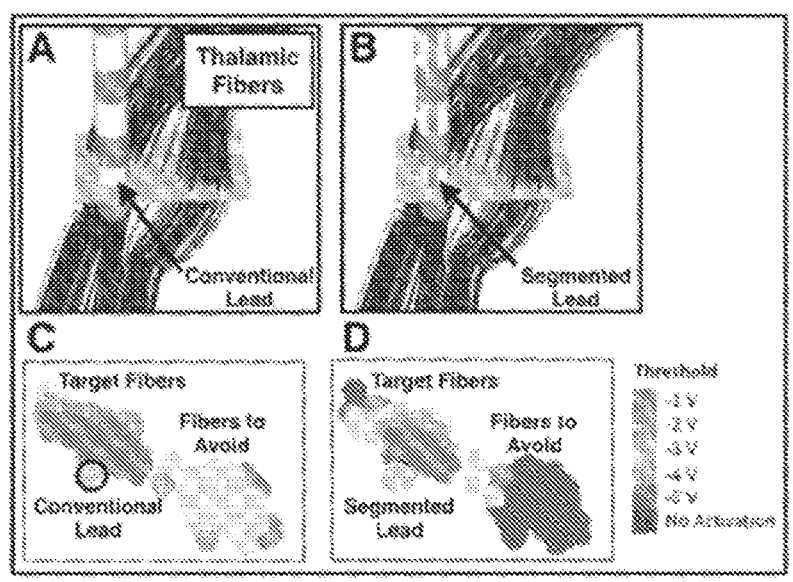
FIGS. 6A-6D illustrate activation predictions of two adjacent fiber pathways in the human thalamus using conventional and segmented DBS leads.

Activation predictions of two adjacent fiber pathways in the human thalamus using conventional and segmented DBS leads are shown in FIGS. 6A-6D. FIG. 6A illustrates a cross-sectional slice through a conventional DBS lead and the targeted thalamic fiber pathways. FIG. 6B illustrates a cross-sectional slice through a segmented DBS lead and the targeted thalamic fiber pathways. FIG. 6C illustrates a two-dimensional projection of the cross-sectional area of FIG. 6A, with the conventional DBS lead, target fibers, and fibers to avoid. The predicted stimulation threshold amplitude across all fibers using the conventional DBS lead is illustrated. FIG. 6D illustrates a two-dimensional projection of the cross-sectional area of FIG. 6B, with the segmented DBS lead, target fibers, and fibers to avoid. A significant reduction in the threshold of activation of fibers to avoid occurs as the voltage increases from 1 to 5V.

In one embodiment, deep brain stimulation apparatus 18 further includes sensors 40 that are configured to provide feedback to determine a state of neuronal activity during application of an electrical stimulus as described above. One or more of the electrical stimulus conditions can be adjusted based on the state of neuronal activity to provide improved selective activation of the subject's central thalamus based on feedback from sensors 40.

Another aspect of the present technology relates to a method of treating a condition characterized by impaired arousal regulation in a subject. The method involves selecting a subject with impaired arousal regulation. One or more electrodes are provided each with one or more contacts. The one or more electrodes are positioned in the selected subject's central thalamus fibers. An electrical stimulus is applied to the positioned one or more electrodes to treat the selected subject for impaired arousal regulation. The positioning and applying are carried out to maximize central lateral nucleus and medial dorsal tegmental tract fiber pathway activation in the selected subject and to minimize central median parafascicularis fiber pathway activation in the selected subject.

Impaired arousal regulation is a key underlying component of a wide range of acquired, inherited, and idiopathic neuropsychiatric illnesses. Most prominently, traumatic brain injuries produce impaired arousal regulation. Additional forms of structural brain injuries that disrupt arousal regulation include anoxia, hypoxia, hypoxic-ischemic injuries, stroke, encephalitis of infectious or autoimmune causes, and a wide range of primary degenerative illnesses such as Parkinson's disease. Importantly, supporting arousal regulation is under present clinical study for restoring cognitive function during seizures or post-ictal states of depressed cortical function. Impaired arousal regulation is an untreated primary feature of neuropsychiatric diseases such as schizophrenia or autism. These applications are noted as relevant examples but are not exhaustive of applications for the specific use of the system to enable selective CL-DTTm activation in an individual to improve arousal regulation.

In one embodiment, a subject having a condition characterized by impaired arousal regulation may be selected for treatment using the method described above. The subject may have a condition selected from the group consisting of brain injury, a neurological degenerative disease, epilepsy, a movement disorder, a post-encephalitis cognitive impairment, a developmental disorder, a post hypoxic-ischemic injury cognitive impairment, and a neuropsychiatric disorder.

The present technology enables the specific positioning of a system within the central thalamus to optimize behavioral facilitation achievable with improved arousal regulation. The technology guides the conceptualization and placement of the system and allows the user to explore a space of stimulation configurations and modes of activation to map a range of behavioral outcomes to the system, as described in further detail below. These maps are inherently multi-dimensional: they include effects on CL-DTTm and Cm-Pf→TRN pathways, multiple possible behavioral facilitation effects, and just as important OFF-target side effects.

Selective activation of the DTTm fiber pathway that projects through the CL nucleus, and not the Cm-Pf complex fiber projections, facilitates performance. Such selective activation can be utilized as therapeutic options for treatment of patients suffering from impaired arousal regulation and enduring cognitive dysfunction. As disclosed in Baker, et al., "Robust Modulation of Arousal Regulation, Performance and Frontostriatal Activity Through Central Thalamic Deep Brain Stimulation in Healthy Non-Human Primates." *J. Neurophysiol.* 116:2383-2404 (2016), the disclosure of which is incorporated by reference herein in its entirety, shaping the DBS electrical field within the 'wing' of CL resulted in robust behavioral facilitation and enhancement of frontal and striatal population activity. These findings are consistent with the behavioral and physiological effects of conventional CT-DBS in a case study in a very severely traumatic brain injury (TBI) patient, as disclosed in Schiff, et al., "Behavioural Improvements with Thalamic Stimulation After Severe Traumatic Brain Injury." *Nature.* 448, 600-3 (2007), the disclosure of which is incorporated herein by reference in its entirety.

The present technology disaggregates the CL thalamus by isolating contributions from CL and DTTm from the contributions of the Cm-Pf complex. Two mechanisms may explain these behavioral results: 1) an intrathalamic inhibitory network similar to that defined in the rodent, as disclosed in Crabtree, et al., "New Intrathalamic Pathways Allowing Modality-Related and Cross Modality Switching in the Dorsal Thalamus." J. Neurosci. 22, 8754-8761 (2002) and Crabtree, "Functional Diversity of Thalamic Reticular Subnetworks." *Front. Syst. Neurosci.* s12 (2018), the disclosures of which are incorporated by reference herein in their entirety), 2) the roles the two pathways play in controlling the anterior forebrain mesocircuit, as disclosed in N. D. Schiff, "Recovery of Consciousness After Brain Injury: A Mesocircuit Hypothesis." *Trends Neurosci.* 33, 1-9 (2010), the disclosure of which is incorporated by reference herein in its entirety, a system involving the thalamus, frontal cortex, and basal ganglia that regulates the overall level of activity in the anterior forebrain.

In one embodiment, the position of segmented single leads and multi-lead systems can be optimized to selectively target the cell bodies of CL and the DTTm pathway and to avoid the fiber projections emanating from Cm-Pf. The isolated activation of the DTTm pathway projecting from CL to frontostriatal targets facilitates behavioral performance. In contrast, mixed activation of the DTTm and fibers projecting from the Cm-Pf complex through the TRN either interrupts or mitigates these facilitation effects.

Although both CL and Cm-Pf have strong striatal projections, their patterns of innervations within the striatum are markedly different, both regionally and with respect to cellular elements and cell types innervated. Single fiber studies note that CL afferents make en passant synapses in TRN before fanning out broadly over the rostral striatum as disclosed in Deschenes, et al., "Striatal and Cortical Projections of Single Neurons From the Central Lateral Thalamic Nucleus in the Rat." *Neuroscience.* 72, 679-687 (1996), the disclosure of which is incorporated by reference herein in its entirety. By contrast, Cm-Pf fibers project heavily into regionally precise zones of the striatum and form bushy local arborizations, as disclosed in Parent, et al., "Axonal Collateralization in Primate Basal Ganglia and Related Thalamic Nuclei." *Thalamus Relat. Syst.* 2, 71 (2002), Smith, et al., "The Thalamostriatal Systems: Anatomical and Functional Organization in Normal and Parkinsonian States." *Brain Res. Bull.* 78, 60-68 (2009), Storch, et al., "Reliability and Validity of the Yale Global Tic Severity Scale." Psychol. Assess. 17, 486-491 (2005), and Smith, et al., "The Thalamostriatal System in Normal and Diseased States." *Front. Syst. Neurosci.* 8 (2014), the disclosures of which are incorporated by reference herein in their entirety. CL and Pf afferents are known to project into the main neuronal populations of the striatum, the medium spiny neurons, as disclosed in (Bolam, et al., "Synaptic Organisation of the Basal Ganglia." *J. Anat.* 196, 527-542 (2000) and Ellender, et al., "Heterogeneous Properties of Central Lateral and Parafascicular Thalamic Synapses in the Striatum." *J. Physiol.* 591, 257-72 (2013), the disclosures of which are incorporated by reference herein in their entirety), whereas Cm neurons project into the local cholinergic inhibitory neurons, as disclosed in Smith, et al., "The Thalamostriatal Systems: Anatomical and Functional Organization in Normal and Parkinsonian States." *Brain Res. Bull.* 78, 60-68 (2009), the disclosure of which is incorporated herein by reference in its entirety. Most importantly, CL fibers have strong and broad frontostriatal projections that strongly activate the entire frontal/prefrontal cortex and rostral striatum with high-frequency stimulation, as disclosed in Li et al., "Uncovering the Modulatory Interactions of Brain Networks in Cognition with Central Thalamic Deep Brain Stimulation Using Functional Magnetic Resonance Imaging." *Neuroscience.* 440, 65-84 (2020), Liu, et al., "Frequency-Selective Control of Cortical and Subcortical Networks by Central Thalamus." Elife. 4, 1-27 (2015), and Baker, et al., "Robust Modulation of Arousal Regulation, Performance and Frontostriatal Activity Through Central Thalamic Deep Brain Stimulation in Healthy Non-Human Primates." *J. Neurophysiol.* 116:2383-2404 (2016), the disclosures of which are incorporated by reference herein in their entirety.

Despite these distinctions, improved arousal and facilitation of behavior have been reported for electrical stimulation of both CL and Cm-Pf. In rodent studies, electrical stimulation of CL facilitates object recognition memory (Shirvalkar, et al., "Cognitive Enhancement with Central Thalamic Electrical Stimulation." *Proc. Natl. Acad. Sci. U.S.A.* 103, 17007-17012 (2006), the disclosure of which is incorporated by reference herein in its entirety), working memory (Chang, et al., "Modulation of Theta-Band Local Field Potential Oscillations Across Brain Networks With Central Thalamic Deep Brain Stimulation to Enhance Spatial Working Memory." *Front. Neurosci.* 13 (2019), the disclosure of which is incorporated by reference herein in its entirety), and decision-making (Mair, et al., "Memory Enhancement with Event-Related Stimulation of the Rostral Intralaminar Thalamic Nuclei." *J. Neurosci.* 28, 14293-14300 (2008) and Mair, et al., "Cognitive Activation by Central Thalamic Stimulation: The Yerkes-Dodson Law Revisited." *Dose-Response.* 9, 313-331 (2011), the disclosures of which are incorporated by reference herein in their entirety). In healthy NHPs, CL dominant stimulation, that includes the DTTm as shown here, facilitates sustained attention, working memory, and pattern-recognition behaviors as disclosed in Baker, et al., "Robust Modulation of Arousal Regulation, Performance and Frontostriatal Activity Through Central Thalamic Deep Brain Stimulation in Healthy Non-Human Primates." *J. Neurophysiol.* 116:2383-2404 (2016), the disclosure of which is incorporated by reference herein in its entirety. In humans, CL stimulation has shown facilitation of a range of cognitive behaviors including motor executive function and speech production, as disclosed in Schiff, et al., "Behavioural Improvements with Thalamic Stimulation After Severe Traumatic Brain Injury." *Nature.* 448, 600-3 (2007), the disclosure of which is incorporated herein by reference in its entirety. However, human studies also report speech facilitation with Cm-Pf stimulation (Bhatnagar, et al., "Effects of Intralaminar Thalamic Stimulation on Language Functions." *Brain Lang.* 92, 1-11 (2005), the disclosure of which is incorporated by reference herein in its entirety) and restoration of arousal in severe brain injury. The inventors have discovered how, given the evidence that activation of either CL or Cm-Pf might produce behavioral facilitation, the findings in FIG. 13A-13, discussed below, can be reconciled In rodents, Crabtree, et al., "New Intrathalamic Pathways Allowing Modality-Related and Cross Modality Switching in the Dorsal Thalamus." *J. Neurosci.* 22, 8754-8761 (2002)., the disclosure of which is incorporated by reference herein in its entirety, demonstrated a structural basis for a rich system of intrathalamic inhibitory interactions and characterized two important findings relevant to the present results: 1) a rich network exists for local inhibition within the thalamus of separate sensory nuclei or motor nuclei; these inhibitory networks appear to be local to either sensory or motor thalamic nuclei; and 2) a cross sensory-to-motor thalamus pathway via the inhibition of the anterior intralaminar group by the caudal intralaminar group. Activation of the caudal intralaminar group produced powerful inhibition and suppression of neuronal firing in the anterior group via a disynaptic connection with TRN. These findings suggest an important motif of intra-thalamic inhibition of the two intralaminar nuclear groups in the thalamus. However, an important distinction in the rodent compared with feline or primate thalamus is the inclusion by Crabtree and Issac of CL as part of the caudal intralaminar group, in large part because the Cm-Pf nucleus is not present in the rodent as disclosed in Jones, *The Thalamus* Springer US, Boston, MA, ed. 2nd, 2007, the disclosure of which is incorporated by reference here in its entirety.

In comparison, Cm-Pf in primates is massively expanded (Jones, et al., "Differential Calcium Binding Protein Immunoreactivity Distinguishes Classes of Relay Neurons in Monkey Thalamic Nuclei." *Eur. J. Neurosci.* 1, 222-246 (1989) and Jones, *The Thalamus* Springer US, Boston, MA, ed. 2nd, 2007, the disclosures of which are incorporated by reference here in their entirety), and CL has been classified as a component of the rostral intralaminar group. Jones, *The Thalamus* Springer US, Boston, MA, ed. 2nd, 2007, the disclosure of which is incorporated by reference here in its entirety, particularly notes that the paralamellar MD densocellular components can be considered posterior cells of the CL nucleus; these neurons strongly project to frontal and pre-frontal cortices and are contiguous with medial aspects of Cm-Pf and the anterior aspects of Pf. Several anatomists have argued for these regions to be included in the human CL nucleus, as disclosed in Jones, *The Thalamus* Springer US, Boston, MA, ed. 2nd, 2007, the disclosure of which is incorporated by reference here in its entirety. Detailed studies of Cm-Pf and CL interactions through the TRN are not available in non-human primate, and the inventors' modeling can be guided only by the observations in the rodent. A direct inhibitory effect on CL and surrounding association nuclei through TRN projections activated by the Cm-Pf-TRN fiber bundle can explain the apparent interference when activation is balanced in the DTTm and Cm-Pf-TRN fibers and the mitigation of this interference, with a 'push-pull' effect tipping toward behavioral release as the DTTm becomes relatively more engaged.

DTTm activation facilitates selective activation of frontostriatal neurons in the awake state. Prior studies have demonstrated that facilitation of cognitively mediated behaviors in the healthy NHP requires a sufficiently powerful activation of frontal and striatal neurons to alter local field potential, as disclosed in Baker, et al., "Robust Modulation of Arousal Regulation, Performance and Frontostriatal Activity Through Central Thalamic Deep Brain Stimulation in Healthy Non-Human Primates." *J. Neurophysiol.* 116: 2383-2404 (2016), the disclosure of which is incorporated by reference herein in its entirety, and individual neuronal spiking dynamics. In the awake state, both frontal neocortical neurons and striatal medium spiny neurons are depolarized and receive a high rate of synaptic input, as disclosed in Steriade, et al., "Natural Waking and Sleep States: A View From Inside Neocortical Neurons." *J. Neurophysiol.* 85, 1969-1985 (2001) and Grillner, et al., "Microcircuits in Action—From CPGs to Neocortex." *Trends Neurosci.* 28, 525-533 (2005), the disclosures of which are incorporated by reference herein in their entirety. Thus, to create sufficient impact as to be measurable in behavioral facilitation, the effects of DBS must be both spatially broad and strongly effective across frontostriatal populations.

Stimulation of CL with microelectrode techniques in awake NHPs demonstrated modest effects of behavioral facilitation, as disclosed in Smith, et al., "The Thalamostriatal Systems: Anatomical and Functional Organization in Normal and Parkinsonian States." *Brain Res. Bull.* 78, 60-68 (2009), the disclosure of which is incorporated herein by reference in its entirety. In contrast, the marked increase of behavioral facilitation achieved by effective geometries produced by 'field-shaping' within the central thalamus (fsCT-DBS) when directly compared with conventional CT-DBS, can be first understood in the context of bulk activation across frontostriatal networks, as disclosed in Baker, et al., "Robust Modulation of Arousal Regulation, Performance and Frontostriatal Activity Through Central Thalamic Deep Brain Stimulation in Healthy Non-Human Primates." *J. Neurophysiol.* 116:2383-2404 (2016), the disclosure of which is incorporated by reference herein in its entirety. In human subjects, bulk activation of frontostriatal neuronal populations has been demonstrated as a common mechanism underlying a variety of effective pharmacological and electrophysiological stimulation treatment methods aimed at improving arousal regulation in the injured brain.

In rodents, optogenetic stimulation of local neuronal populations within the central thalamus demonstrates that CL stimulation uniquely activates the entire frontostriatal system as measured at the whole brain level using functional magnetic resonance, as disclosed in Liu, et al., "Frequency-Selective Control of Cortical and Subcortical Networks by Central Thalamus. *Elife.* 4, 1-27 (2015), the disclosure of which is incorporated herein by reference in its entirety. The selective effect of stimulation of DTTm fibers demonstrated here is consistent with CL stimulation providing a broad excitatory input across frontal cortical and striatal regions. Even limited co-activation of the Cm-Pf→TRN fibers had a suppressive effect on behavior draws attention to the further distinctions of CL neurons and those within the parafascularis (Pf) and centromedian (Cm) nuclei.

The distinctions between CL and Cm-Pf neurons extend to their postsynaptic effects on inhibitory medium spiny neurons (MSNs), the neurons that project out of the striatum to the Globus pallidus (internal division). Whole-cell patch-clamp studies of MSNs optogenetically activated by either CL or Pf afferents show that CL afferents act through AMPA receptors and are more effective in driving MSN action potentials. Additionally, the Pf afferents, which act via NMDA receptors, generate long-term depression through mechanisms of synaptic plasticity, as disclosed in Ellender, et al., "Heterogeneous Properties of Central Lateral and Parafascicular Thalamic Synapses in the Striatum." *J. Physiol.* 591, 257-72 (2013), the disclosure of which is incorporated by reference herein in its entirety. These physiological distinctions likely provide additional contributions to the mitigation of behavioral facilitation achieved through DTTm activation when Cm-Pf fibers are co-activated because these projections continue in the striatum to MSNs. The excitation of MSNs by CL leads to disynaptic disinhibition of the thalamus through the anterior forebrain mesocircuit, as disclosed in Fridman, et al., "Neuromodulation of the Conscious State Following Severe Brain Injuries." *Curr. Opin. Neurobiol.* 29, 172-177 (2014), the disclosure of which is incorporated by reference herein in its entirety and Schiff, "Recovery of Consciousness After Brain Injury: A Mesocircuit Hypothesis." *Trends Neurosci.* 33, 1-9 (2010), the disclosure of which is incorporated by reference herein in its entirety, and co-activation of Pf fibers can oppose this thalamic disinhibition through suppression of the MSNs. Thus, the balance between CL-DTTm and CM-Pf afferents to the MSNs becomes a means by which the overall activity level of the thalamus can be regulated.

Important distinctions at the cortical level are also expected to influence the impact of CL versus Cm-Pf activations; whereas CL innervates the cortex broadly, Cm-Pf projections are comparatively sparse, as disclosed in Jones, *The Thalamus* Springer US, Boston, MA, ed. 2nd, 2007, the disclosure of which is incorporated by reference here in its entirety. Within the neocortex, the broad innervation of supragranular and infragranular layers by CL afferents is associated with supralinear summation of effects across cortical columns, as disclosed in Llinás, et al., "Temporal Binding Via Cortical Coincidence Detection of Specific and Nonspecific Thalamocortical Inputs: A Voltage-Dependent Dye-Imaging Study in Mouse Brain Slices." *Proc. Natl. Acad. Sci. U. S.* 816 A. 99, 449-454 (2002), the disclosure of which is incorporated herein by reference in its entirety. Collectively, it is likely that the encroachment of activation on Cm-Pf reduces the bulk activation of frontal cortical and striatal regions through local synaptic effects within the striatum where short-term depression may affect patchy regions of striatum innervated by Cm-Pf projections and interfere with behavioral facilitation, as disclosed in (Smith, et al., "The Thalamostriatal Systems: Anatomical and Functional Organization in Normal and Parkinsonian States." *Brain Res. Bull.* 78, 60-68 (2009) and Ellender, et al., "Heterogeneous Properties of Central Lateral and Parafascicular Thalamic Synapses in the Striatum." *J. Physiol.* 591, 257-72 (2013), the disclosures of which are incorporated by reference herein in their entirety). Additionally, powerful inhibition of cell bodies within parts of CL or paralaminar thalamic regions (that contain neurons with identical properties (Jones, *The Thalamus* Springer US, Boston, MA, ed. 2nd, 2007 and Münkle, et al., "The Distribution of Calbindin, Calretinin and Parvalbumin Immunoreactivity in the Human Thalamus." *J. Chem. Neuroanat.* 19, 155-173 (2000), the disclosures of which are incorporated by reference herein in their entirety) via feedback inhibition from the TRN (Crabtree, et al., "New Intrathalamic Pathways Allowing Modality-Related and Cross Modality Switching in the Dorsal Thalamus." *J. Neurosci.* 22, 8754-8761 (2002)., the disclosure of which is incorporated by reference herein in its entirety) as described above may suppress thalamic output not captured by direct electrical stimulation.

In comparison to the broad bulk activation required to produce behavioral facilitation with CT-DBS in DTTm, recent work in anesthetized NHPs has demonstrated that very local stimulation within the CL nucleus using multiple 25 µm contacts spaced 200 µm apart could produce arousal from Propofol and isoflurane anesthesia, as disclosed in Redinbaugh, et al., "Thalamus Modulates Consciousness via Layer-Specific Control of Cortex." *Neuron*, 1-10 (2020), the disclosure of which is incorporated by reference herein in its entirety. The effective electrotonic length of these microprobe contacts, which determines the current flow achieved locally, as disclosed in Ranck, "Which Elements are Excited in Electrical Stimulation of Mammalian Central Nervous System: A Review." *Brain Res.* 98, 417-440 (1975), the disclosure of which is incorporated by reference herein in its entirety, is very short compared to the broad region activated by the fsCT-DBS configurations studied here. Of note, stimulation at 50 Hz but not 200 Hz was effective in producing arousal during anesthesia. In comparison, in the awake monkeys studied, stimulation at 150 Hz-225 Hz demonstrated the strongest behavioral facilitation and robust activation in frontal and striatal regions, as reflected by a marked increase in the beta and gamma frequency range and a decrease in the lower frequency bands measured directly in these locations, as disclosed in Baker, et al., "Robust Modulation of Arousal Regulation, Performance and Frontostriatal Activity Through Central Thalamic Deep Brain Stimulation in Healthy Non-Human Primates." *J. Neurophysiol.* 116:2383-2404 (2016), the disclosure of which is incorporated by reference herein in its entirety. These differences likely reflect the need, in addition to achieving broad activation in the awake state, to increase levels of background synaptic activity received by neocortical and striatal neurons past particular thresholds, as disclosed in Larkum, et al., "Calcium Electrogenesis in Distal Apical Dendrites of Layer 5 Pyramidal Cells at a Critical Frequency of Back-Propagating Action Potentials." *Proc. Natl. Acad. Sci. U.S.A.* 96, 14600-14604 (1999), Larkum, et al., "Dendritic Spikes in Apical Dendrites of Neocortical Layer 2/3 Pyramidal Neurons. *J. Neurosci.* 27, 8999-9008 (2007), and Larkum, et al., "Synaptic Integration in Tuft Dendrites of Layer 5 Pyramidal Neurons: A New Unifying Principle." *Science* 325, 756-760 (2009), the disclosures of which are incorporated by reference herein in their entirety. Intrinsic integrative properties of individual neocortical neurons change with increasing levels of background synaptic input, as disclosed in Bernander, et al., "Synaptic Background Activity Influences Spatiotemporal Integration in Single Pyramidal Cells." *Proc. Natl. Acad. Sci. U.S.A.* 88, 11569-11573 (1991), the disclosure of which is incorporated by reference herein in its entirety. In order to trigger dendritic electrogenesis in neocortical neurons, across all layers, incoming excitatory inputs must have frequencies higher than ~130 Hz, as disclosed in Larkum, et al., "Calcium Electrogenesis in Distal Apical Dendrites of Layer 5 Pyramidal Cells at a Critical Frequency of Back-Propagating Action Potentials." *Proc. Natl. Acad. Sci. U.S.A.* 96, 14600-14604 (1999), Larkum, et al., "Dendritic Spikes in Apical Dendrites of Neocortical Layer 2/3 Pyramidal Neurons. *J. Neurosci.* 27, 8999-9008 (2007), and Larkum, et al., "Synaptic Integration in Tuft Dendrites of Layer 5 Pyramidal Neurons: A New Unifying Principle." *Science* 325, 756-760 (2009), the disclosures of which are incorporated by reference herein in their entirety. Similarly, the primary output neurons of the striatum, medium spiny neurons, require very high rates of background synaptic inputs to maintain membrane depolarization sufficient to generate action potentials, as disclosed in Grillner, et al., "Mechanisms for Selection of Basic Motor Programs—Roles for the Striatum and Pallidum." *Trends Neurosci.* 28, 364-370 (2005), the disclosure of which is incorporated by reference herein in its entirety. Both mechanisms likely play a role in the requirement for high-frequency stimulation in the awake state, as disclosed in Schiff, "Central Lateral Thalamic Nucleus Stimulation Awakens Cortex via Modulation of Cross-Regional, Laminar-Specific Activity during General Anesthesia." *Neuron.* 106, 1-3 (2020), the disclosure of which is incorporated by reference herein in its entirety.

The selective effect of 50 Hz CL stimulation in the anesthetized monkey may alternatively reflect antidromic activation of brainstem cholinergic and/or noradrenergic fibers that innervate CL. The brainstem neurons projecting to CL are known to have resonant properties at ~40-50 Hz whereas higher frequencies of stimulation actually block action potentials, as disclosed in Garcia-Rill, et al., "Coherence and Frequency in the Reticular Activating System (RAS)." *Sleep Med. Rev.* 17, 227-238 (2013) and Garcia-Rill, J, et al., "The physiology of the pedunculopontine nucleus: implications for deep brain stimulation." *J. Neural Transm.* 122, 225-235 (2015), the disclosures of which are incorporated by reference herein in their entirety, perhaps accounting for why others saw no effect during high-frequency stimulation.

Methods of Surgical Planning

A further aspect of the present technology relates to a method for surgical planning involving selective activation of central thalamus fibers in a subject implemented by one or more surgical planning computing devices. The method involves segmenting the central thalamus in an image of the subject's brain to produce a segmented brain model. One or more fiber pathways in the segmented brain model are modeled. Initial model electrode positions are generated in the segmented brain model. A stimulation map is produced based on the modelling and generating. A position for the one or more electrodes in the subject's central thalamus fibers and electrical stimulus conditions for the positioned one or more electrodes are identified to selectively activate the central thalamus fibers of the subject so that central lateral nucleus and medial dorsal tegmental tract fiber pathway activation in the subject is maximized and central medial parafascicularis fiber pathway activation in the subject is minimized based on the produced simulation map.

Further aspects of the technology relate to a surgical planning computing device and a non-transitory computer readable medium configured to perform the disclosed methods for surgical planning. Such a computing device and computer readable medium is described in further detail with respect to FIG. 1.

Figure 7:
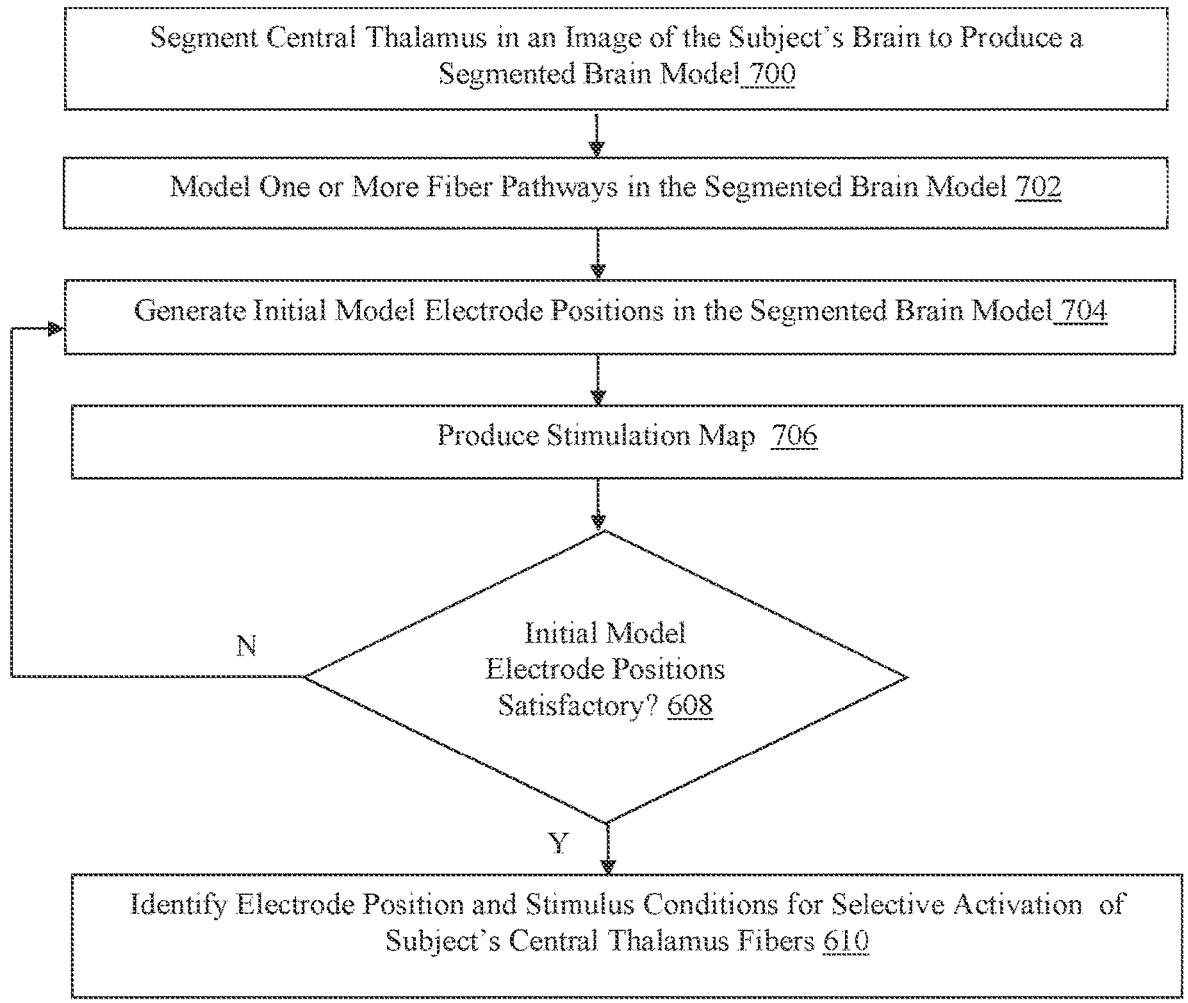
FIG. 7 is a flowchart of an exemplary method for surgical planning involving selective activation of central thalamus fibers in a subject.

Referring now to FIG. 7, an exemplary method for surgical planning involving selective activation of central thalamus fibers in a subject will be described. The method may be performed by one or more computing devices, such as surgical planning computing device 14 as illustrated in FIG. 1.

Referring again to FIG. 7, in step 700 the central thalamus is segmented in an image of the subject's brain to produce a segmented brain model using known techniques.

In step 702, one or more fiber pathways in the segmented brain model are modeled. Identification of the location of this confluence of fiber pathways can be optimally achieved with the use of diffusion tensor imaging according to available published methods such as, Edlow et al., "Neuroanatomic Connectivity of the Human Ascending Arousal System Critical to Consciousness and Its Disorders," *J. Neuropathol. Exp. Neurol.* 71(6): 531-46 (2012), which is incorporated herein by reference in its entirety.

In step 704, initial model electrode positions are generated in the segmented brain model. The initial model electrode positions are generated based on data stored on surgical computing device 14 for identifying areas for implantation to provide selective activation of the subject's thalamus. In one embodiment, the segmented brain model is registered to a brain model atlas to identify anatomical nuclei in the segmented brain model in order to identify the initial model electrode positions. The registration may be performed using techniques such as symmetric normalization.

In step 706, a stimulation map is produced. The stimulation map is produced using the segmented model of the subject's central thalamus. The initial model electrode positions are used to apply a modeled stimulus in order to generate the stimulation map to identify the fiber pathways that are activated as a result of applying the model stimulus.

Optionally, in step 708, a determination is made based on the stimulation map produced in step 706 whether the initial model electrode positions are ideal for selectively activating the central thalamus fibers of the subject so that central lateral nucleus and medial dorsal tegmental tract fiber pathway activation in the subject is maximized and central medial parafascicularis fiber pathway activation in the subject is minimized. If, in step 708, the NO branch is taken, the process is repeated from step 704 with new model electrode positions. If, in step 708, the YES branch is taken, the method proceeds to step 710.

In step 710, a position for the one or more electrodes in the subject's central thalamus fibers and electrical stimulus conditions for the positioned one or more electrodes are identified to selectively activate the central thalamus fibers of the subject so that central lateral nucleus and medial dorsal tegmental tract fiber pathway activation in the subject is maximized and central median parafascicularis fiber pathway activation in the subject is minimized based on the produced simulation map.

The exemplary method may be employed in pre-operative, intra-operative, and post-operative settings. Pre-operative planning may be employed to determine locations to implant the electrodes/leads in each brain hemisphere to have the highest likelihood of activating the target structures while avoiding other structures. During pre-operative planning, a wide range of range of DBS lead positions and trajectories are explored. The parameter space includes a 6 degree of freedom problem in terms of spatial transformations, and 7 degrees of freedom for directional DBS leads. The described methods allow for determining locations to implant the electrodes, such as electrodes 32 to selectively activate the central thalamus fibers of the subject so that central lateral nucleus and medial dorsal tegmental tract fiber pathway activation in the subject is maximized and central medial parafascicularis fiber pathway activation in the subject is minimized.

The exemplary method may also be employed intra-operatively to further determine if the applied activation is on target during execution of the pre-operative plan. Information gathered intra-operatively, such as feedback from sensors 40, is used to assess the degree to which the pre-operative plan is being followed. This data is recorded and stored in the patient model on surgical computing device 14. One or more sensors 40 are temporarily implanted in the patient to record neural activity that could indicate whether the pre-operative plan is being executed. Intra-operative imaging (MRI, CT, endoscopy) using imaging device 16 may also be employed to confirm the lead position.

Additionally, the exemplary method may be utilized in post-operative planning. Post-operative planning may be utilized to program the stimulator, such as stimulus signal generator 38, to provide stimulation to the patient to provide a therapeutic benefit. Post-operative imaging (MRI or CT) using imaging device 16 is used to confirm the actual DBS lead locations, such as electrodes 32, in each hemisphere. This imaging is co-registered with the pre-operative imaging in the patient model stored on surgical planning computing device 14. At this point, the lead locations are fixed and cannot be changed without an additional surgery. Therefore, the electrical stimulation conditions, as described above, such as which electrodes to activate as anodes or cathodes and what waveforms to use to achieve target activation with minimal spillover into other structures may be adjusted. Simulations are used to systematically explore this parameter space and recommend stimulation settings for stimulus signal generator 38, such as a pulse generator.

The system will further allow the post-implantation location of the electrode(s) to be determined instantly to allow for accurate post-implantation titration of behavioral effects and annotation of positive and negative behavioral effects to customize the system for programming of electrical current for an individual subject. The system will allow for post-implantation titration of electrical evoked activity when used in conjunction with high density EEG.

EXAMPLES

The present description is further illustrated by the following examples, which should not be construed as limiting in any way.

Example 1—Materials and Methods

Animal Care

All work was performed in strict accordance with the National Institutes of Health Guidelines for Use of Animals in research and under an approved protocol from the Weill Cornell Medical College Institutional Animal Care and Use Committee (IACUC).

Imaging and Surgical Procedure

A detailed description of the imaging and surgical procedures can be found in prior publications including Baker et al., "Robust Modulation of Arousal Regulation, Performance and Frontostriatal Activity Through Central Thalamic Deep Brain Stimulation in Healthy Non-Human Primates." *J. Neurophysiol.* 116:2383-2404 (2016) and Purpura, et al., "Analysis of Perisaccadic Field Potentials in the Occipitotemporal Pathway during Active Vision." *J. Neurophysiol.* 90, 3455-3478 (2003), the disclosures of which are incorporated by reference herein in their entirety).

Briefly, following successful behavioral training, each animal was anesthetized and placed in a magnetic resonance (MR) compatible stereotaxic surgical frame (Kopf Instruments, 1430M) for presurgical MR (3T Siemens) and computed tomography (Siemens PET/CT) imaging. These images were then registered to a high-resolution MRI-DTI macaque full-brain atlas with 241 segmented anatomical structures for surgical planning using 3D Slicer. Segmentations of the thalamic nuclei, cortical regions, and DBS leads were used in the modeling software to plan the entry and end points for each DBS lead and the custom cephalic chambers (Gray Matter Research, LLC). Contrast enhanced MR imaging (Ablavar, Lantheus Medical Imaging Inc., North Billerica, MA) was used to visualize the vasculature and plan the trans-ventricular DBS lead trajectories that typically had an entry point at the somatosensory cortex and end point within the Cm-Pf nucleus. Following insertion, the DBS leads were secured and housed within a Deep Brain Recording and Stimulation (DBRS) device (Gray Matter Research, LLC) customized for each animal. In addition to the DBRS system, a head fixation post (Gray Matter Research, LLC), Titanium grounding plates and grounding screws, and a 32-128 microelectrode microdrive was implanted in each animal using standard sterile surgical techniques as disclosed in Baker, et al., "Robust Modulation of Arousal Regulation, Performance and Frontostriatal Activity Through Central Thalamic Deep Brain Stimulation in Healthy Non-Human Primates." *J. Neurophysiol.* 116:2383-2404 (2016) and Purpura, et al., "Analysis of Perisaccadic Field Potentials in the Occipitotemporal Pathway during Active Vision." *J. Neurophysiol.* 90, 3455-3478 (2003), the disclosures of which are incorporated by reference herein. Electrophysiological signals were recorded in each animal but not analyzed in this study. The animals were allowed to recover for 30-45 days before resuming behavioral training and the DBS experiments. A computed tomography scan was performed 30 days following implantation to visualize the metal artifacts created by each DBS lead contact and was used to reconstruct the DBS lead locations relative to the thalamic nuclei in the biophysical model.

Subjects

Three adult male (11, 10, and 12 kg) non-human primates (NHP), *Macaca* mulatta, were used in this study. Previously collected behavioral and imaging data collected from two animals as disclosed in Baker, et al., "Robust Modulation of Arousal Regulation, Performance and Frontostriatal Activity Through Central Thalamic Deep Brain Stimulation in Healthy Non-Human Primates." *J. Neurophysiol.* 116:2383-2404 (2016), the disclosure of which is incorporated by reference herein in its entirety, NHP1 and NHP2, was combined with new data collected in a third animal (NHP3) performing a similar visuomotor reaction time task, as detailed below.

Behavioral Tasks

Two animals (NHP1 and NHP2) were trained to continuously perform a variable delay period visuomotor reaction-time task "S1-S2," or "phasic alerting" paradigm used in both human and NHP studies as disclosed in (Smith, et al., "The Thalamostriatal Systems: Anatomical and Functional Organization in Normal and Parkinsonian States." *Brain Res. Bull.* 78, 60-68 (2009), Posner, *Chronometric Explorations of Mind* (Lawrence Erlbaum, 1978), Kinomura, et al., "Activation by Attention of the Human Reticular Formation and Thalamic Intralaminar Nuclei." *Science.* 271, 512-515 (1996), Shah, et al., 2009 Annual International Conference of the IEEE Engineering in Medicine and Biology Society (IEEE, 2009), and Schiff, et al., "Gating of Attentional Effort Through the Central Thalamus." *J. Neurophysiol.* 109, 1152-1163 (2013), the disclosures of which are incorporated by reference herein in their entirety. Briefly, the structure of this task is initiated by the appearance of a target (a black/red checkerboard or dartboard 5-degree×5-degree of visual angle) at 1 of 9 locations (chosen at random on each trial) on a CRT monitor positioned in front of the animal. After a 1-second period of stable fixation of the target, the target underwent contrast reversal at 10 Hz for a variable delay period until changing to a black/green checkerboard or dartboard. The transition to black/green from black/red was the 'GO' signal for the animal to contact the infrared (IR) touch switch located within the primate chair (Crist Instrument Co. Inc., Hagerstown, MD). The variable delay period was randomly drawn from a normal distribution with a mean of 2500 ms and a standard deviation of 250 ms. A trial was considered to be incorrect if the NHP broke fixation prior to the 'GO' cue or touched the IR switch before or within 250 ms after the 'GO' cue or failed to respond within 800 ms after the green target. The third animal, NHP3, was trained to perform a similar variable delay period visuomotor reaction time task, but this task required the animal to initiate each trial of the task by placing its hand over the IR switch, i.e. to engage the task. The IR touch switch would initiate the task in a customized program (NIMH MonkeyLogic as disclosed in Hwang, et al., "NIMH MonkeyLogic: Behavioral Control and Data Acquisition in MATLAB." J. Neurosci. Methods. 323, 13-21 (2019), the disclosure of which is incorporated by reference herein in its entirety, that controlled the visual appearance of a central grayscale Gabor (3-degrees of visual angle) embedded in a 1/f noise pattern that filled the LCD monitor. The animal had to maintain fixation on the Gabor (a circular window with 5-8 degrees of visual angle in extent) as the spatial phase changed (every 300 ms) for a variable number of phase transitions (lasting 900-3000 sec) before changing orientation and phase (from 0 to 22.5 or 45 degrees). The change in orientation acted as the 'GO' signal and the animal had to remove its hand from the IR switch within 900 ms to receive a juice reward. Any given trial was considered to be 'engaged' when the IR switch was triggered following a correct or incorrect trial, regardless of the outcome. For example, the animal might touch the switch, which initiated the task sequence and then it would break fixation of the Gabor, thus aborting the trial; or it might maintain fixation and remove its hand from the IR switch shortly after triggering the task sequence. Although different visually and in motor sequence, the two tasks require sustained attention and stable fixation over variable delay periods and over extended periods of time, typically lasting 1.5-3 hours.

Central Thalamic Deep Brain Stimulation

The DBS leads were scaled for the NHP, as disclosed in Elder, et al., Chronic Implantation of Deep Brain Stimulation Leads in Animal Models of Neurological Disorders." J. Neurosci. Methods. 142, 11-16 (2005), the disclosure of which is incorporated by reference herein in its entirety, based on the relative dimensions of a commercial DBS lead (Medtronic 3387 lead). In this study, the DBS leads (0.84 mm OD) had six platinum/iridium annular contacts, each 0.5 mm in height, with an intra-lead spacing of 0.5 mm and insulated by polyurethane (NuMED, Inc. Hopkinton, NY). A four-channel Multi Channel Systems MCS GmbH stimulator (STG4004-3.2 mA) with a compliance of 120 volts was connected to the DBS leads to provide independent current controlled stimulation. The stimulation waveform consisted of an 80 µs square cathodal pulse followed by an isoelectric period of 60 µs and ended with a 400 µs square anodal pulse to balance the total 5:1 cathode to anode charge. Each pulse lasted a total of 540 µs. This stimulation waveform mirrors the output of the Medtronic Inc. clinical system (as described in Butson, et al., "Probabilistic Analysis of Activation Volumes Generated During Deep Brain Stimulation." Neuroimage. 54, 2096-2104 (2011), the disclosure of which is incorporated by reference herein in its entirety) and provided safe and preferential activation of large myelinated axons as disclosed in Merrill, et al., "Electrical Stimulation of Excitable Tissue: Design of Efficacious and Safe Protocols." J. Neurosci. Methods. 141, 171-98 (2005) and Nowak, et al., "Axons, But Not Cell Bodies, are Activated by Electrical Stimulation in Cortical Gray Matter." Exp. Brain Res. 118, 489-500 (1998), the disclosures of which are incorporated by reference herein in their entirety. In this study, stimulation frequencies of 150, 175, 200, and 225 Hz, and amplitudes of 0.25-3.0 mA were used. Following implantation, a monopolar review (200 Hz, ramp from 0.25 to 3 mA) for each contact was conducted to identify any adverse effects of stimulation. For example, consistent paresthesia's or motor movements. A wide range of intra-lead and inter-lead anode-cathode configurations were explored during the experimental sessions in each animal.

In this study, configurations that led to behavioral facilitation were then used in the model. In NHP1 10 configurations, 462 DBS periods, and 42 experimental sessions were included. In NHP2 4 configurations, 11 of DBS periods during one experimental sessions were included. In NHP3 25 configurations, 116 DBS periods and 15 experimental sessions were included.

Computational Modeling of Electrical Stimulation in the Thalamus

In Baker, et al., "Robust Modulation of Arousal Regulation, Performance and Frontostriatal Activity Through Central Thalamic Deep Brain Stimulation in Healthy Non-Human Primates." J. Neurophysiol. 116:2383-2404 (2016), the disclosure of which is incorporated by reference herein in its entirety, a simple model of axonal node activations using a diffusion tensor brain template of the NHP, as disclosed in Adluru, et al., "A Diffusion Tensor Brain Template for Rhesus Macaques." Neuroimage. 59, 306-18 (2012), the disclosure of which is incorporated by reference herein in its entirety, was used in combination with subject-specific imaging and histological reconstruction of the DBS lead locations. Here, an animal-specific virtual DBS pre-surgical planning model, as disclosed in Janson, et al., "Targeting Neuronal Fiber Tracts for Deep Brain Stimulation Therapy Using Interactive, Patient-Specific Models." J. Vis. Exp. 138:572-92 (2018), the disclosure of which is incorporated by reference herein in its entirety, was used to set the lead locations and inter-lead spacing in NHP3 to optimize targeting of the 'wing' of the central lateral (CL) nucleus, as disclosed in Jones, "A New View of Specific and Nonspecific Thalamocortical Connections." Adv. Neurol. 77, 49-73 (1998), the disclosure of which is incorporated by reference herein in its entirety, which contains the highest concentration of DTTm fibers, as disclosed in Edlow, et al., "Neuroanatomic Connectivity of the Human Ascending Arousal System Critical to Consciousness and its Disorders." J. Neuropathol. Exp. Neurol. 71, 531-46 (2012), the disclosure of which is incorporated by reference herein in its entirety. Following implantation of the DBS leads, a 30-day postoperative computed tomography scan was acquired to identify the DBS lead locations based on the imaging artifacts produced by the lead contacts. The postoperative scan was then rigidly registered to the preoperative surgical imaging to identify the individual contacts of the DBS leads relative to the thalamic targets. The DBS lead locations in NHP1 and NHP2 were derived from imaging and later confirmed using standard post-mortem histology techniques and in NHP3, the lead locations were derived from imaging alone. Anatomical nuclei were identified based upon non-linear registration of the preoperative MRI to a high-resolution macaque atlas, as disclosed in Calabrese, et al., "A Diffusion Tensor MRI Atlas of the Postmortem Rhesus Macaque Brain." Neuroimage. 117, 408-416 (2015), the disclosure of which is incorporated by reference herein in its entirety, using symmetric normalization, as disclosed in Avants, et al., "Symmetric Diffeomorphic Image Registration with Cross-Correlation: Evaluating Automated Labeling of Elderly and Neurodegenerative Brain." *Med. Image Anal.* 12, 26-41 (2008), the disclosure of which is incorporated by reference herein in its entirety. A high resolution diffusion MRI dataset, acquired ex vivo from one adult male *Macaca* mulatta was nonlinearly registered to the Calabrese atlas for deterministic tractography using DSI Studio. The in-plane resolution was 0.250 mm, and the slice thickness was 0.254 mm. The diffusion data were reconstructed using generalized q-sampling imaging, as disclosed in Yeh, et al., "Generalized Q-Sampling Imaging." *Med. Imaging, IEEE Trans.* 29, 1626-1635 (2010), the disclosure of which is incorporated by reference herein in its entirety, with a diffusion sampling length ratio of 1.5. Three fiber orientations per voxel were resolved with an 8-fold orientation distribution function (ODF) tessellation. The two reconstructed tracts in the central thalamus were: the DTTm, seeded in the pedunculopontine nucleus with CL and prefrontal cortex as regions of interest (ROIs); Cm-Pf fibers (seeded in the Cm-Pf nucleus with TRN as the ROI).

The finite element method (FEM) was used in SCIRun 5.0 (SCI Institute, University of Utah, Salt Lake City, UT, to solve the bioelectric field problem and compute the voltage distribution through simulated brain tissue surrounding the DBS leads. Similar computational models used to predict the effects of DBS have been validated in prior human and NHP studies as disclosed in Butson, et al., "Patient-Specific Analysis of the Volume of Tissue Activated During Deep Brain Stimulation." *Neuroimage.* 34, 661-70 (2007) and Miocinovic, et al., "Experimental and Theoretical Characterization of the Voltage Distribution Generated by Deep Brain Stimulation." *Exp Neurol.* 216, 166-76 (2009), the disclosures of which are incorporated by reference herein in their entirety.

A FEM tetrahedral mesh was created for each animal, and the DBS leads were positioned in the model based upon the both the postoperative computed tomography artifact (NHP3 only) and histology for NHP1 and NHP2. Isotropic conductivities were applied for the DBS contacts at sigma=$1 \times 10^6$ S m$^{-1}$, the non-conductive shaft segments at sigma=$1 \times 10^{-10}$ S m$^{-1}$, and brain tissue at sigma=0.2 S m$^{-1}$. The conductance of the 100 um thick encapsulation layer between the DBS and brain tissue was adjusted to match the average measured impedance in vitro for each animal. The bioelectric field forward problem was solved using a current point source, set to $-1$ mA, at the center of the active contact. The outer surface of the FEM was set as the distant return for monopolar simulations.

A multi-compartment neuron model was placed along each tract for the three reconstructed fiber bundles. The neurons were modeled as 2 µm myelinated axons with a 323.2 µm spacing between nodes of Ranvier and biophysical properties derived from the MRG model, as disclosed in McIntyre, et al., Model-Based Analysis of Deep Brain Stimulation of the Thalamus." *Conf. Proc. IEEE Eng. Med. Biol. Soc.* 3, 2047-2048 (2002), the disclosure of which is incorporated by reference herein in its entirety. The computed electric potentials from each FEM model were linearly interpolated onto the neuron models, and NEURON 7.4 was used to simulate the neuronal response to the extracellular DBS waveform. Each neuron was determined to be activated if a compartment reached firing threshold in response to the applied waveform at a given amplitude.

Statistical Analysis

To provide a visual estimation of the animal's performance across experimental sessions the series of correct, '1' and incorrect, '0' trials were used to generate a state space model, as disclosed in Smith, et al., "The Thalamostriatal Systems: Anatomical and Functional Organization in Normal and Parkinsonian States." *Brain Res. Bull.* 78, 60-68 (2009), the disclosure of which is incorporated herein by reference in its entirety. This smooth estimate of percentile performance, from 0-100% was used to visualize task performance and task engagement as a function of trial number. The odds ratio is the probability of the animal performing a correct trial during DBS divided by the probability of performing a correct trial prior to DBS onset. The log of this ratio is the log odds ratio (LOR). Positive LOR values correspond to a greater probability of the animal performing a correct trial during DBS.

The log of the odds ratio (LOR) was used to quantify the effect size of DBS during a block of trials compared to performance during the block of trials prior to DBS. The LOR was computed as the log of the ratio of the odds of correctly performing a trial during a DBS ON period to the odds of correctly performing a trial during the immediately prior DBS OFF period. Odds ratios for all DBS periods were computed and subjected to a 95% confidence based on the standard error and the total number of trials in both the ON and OFF periods. A minimum of 20 trials prior to the onset and 20 trials during DBS were required for a DBS period to be included in this study. Statistical significance was determined at an a level of $p<0.05$.

To assess whether behavioral performance changed based upon activation of specific central thalamic pathways, a multivariable mixed effects regression model was implemented. The percent activation of both the DTTm and Cm-Pf fiber pathways was calculated for each DBS period based upon the current configuration and amplitude. The percent activation of each fiber bundle formed the explanatory variables to determine if stimulation of these pathways could predict the experimentally observed change in performance measured as the LOR. A total of 589 DBS periods and 39 unique stimulation configurations across the three animals were included in this analysis. Random intercepts were included to allow for correlation among repeat outcome measures within stimulation configurations and random effects for each subject.

Example 2—Results

Figures 8A, 8B:
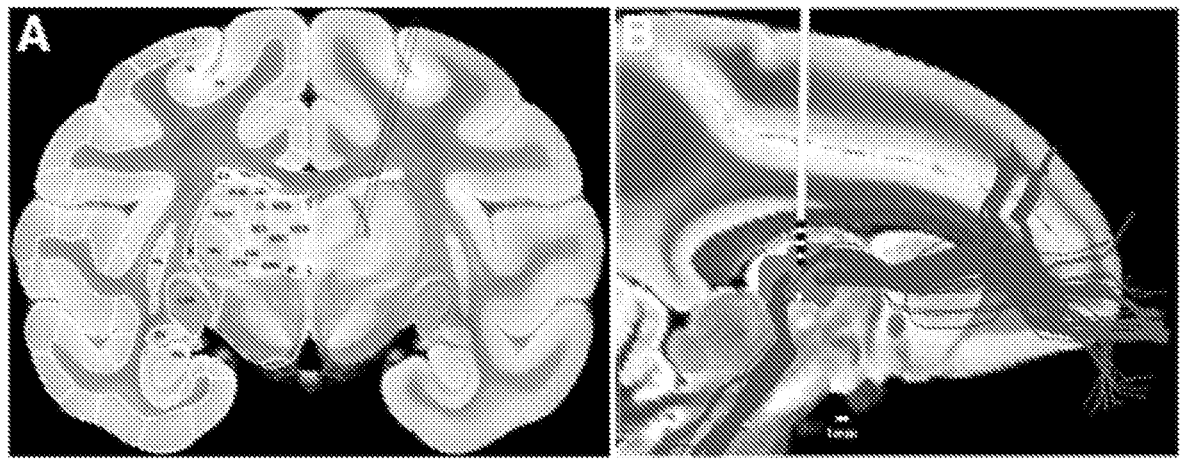
FIGS. 8A and 8B illustrate multiple scaled DBS leads used to target the central lateral (CL) nucleus of the NHP thalamus.
Figures 9A, 9B, 9C:
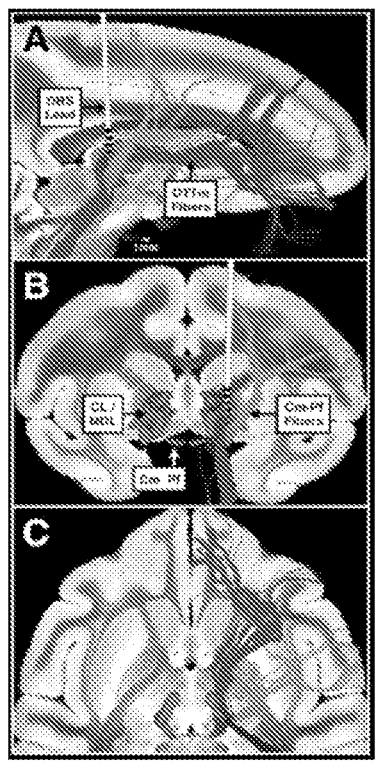
FIGS. 9A through 9C illustrate additional views of multiple scaled DBS leads used to target the central lateral (CL) nucleus of the NHP thalamus.

Targeting of Central Thalamic Arousal Regulation Pathways for Deep Brain Stimulation The goal was to target the central lateral (CL) nucleus of the NHP thalamus (FIG. 8A) with multiple scaled DBS leads, as disclosed in Elder, et al., "Chronic Implantation of Deep Brain Stimulation Leads in Animal Models of Neurological Disorders." *J. Neurosci. Methods.* 142, 11-16 (2005), the disclosure of which is incorporated by reference herein in its entirety, for long-term behavioral experimentation. Previously collected behavioral and imaging data (NHP1 and NHP2) and new behavioral and imaging data collected in a third animal (NHP3) were used to construct a new biophysical modeling framework, as disclosed in Janson, et al., "Targeting Neuronal Fiber Tracts for Deep Brain Stimulation Therapy Using Interactive, Patient-Specific Models." *J. Vis. Exp.* 138:572-92 (2018), the disclosure of which is incorporated by reference herein in its entirety, to investigate differential activation of derived fiber pathways within the NHP thalamus. Previously work had shown that specific CT-DBS anode-cathode configurations resulted in consistent facilitation, suppression or no effect on behavioral performance, which generally followed an inverted-U relationship with the amplitude of stimulation, as disclosed in Baker, et al., "Robust Modulation of Arousal Regulation, Performance and Frontostriatal Activity Through Central Thalamic Deep Brain Stimulation in Healthy Non-Human Primates." *J. Neurophysiol.* 116:2383-2404 (2016), the disclosure of which is incorporated by reference herein in its entirety, and it was hypothesized that behavioral facilitation was likely a result of bulk activation of the medial dorsal tegmental tract (DTTm), as disclosed in Edlow, et al., "Neuroanatomic Connectivity of the Human Ascending Arousal System Critical to Consciousness and its Disorders." *J. Neuropathol. Exp. Neurol.* 71, 531-46 (2012), the disclosure of which is incorporated by reference herein in its entirety. Therefore, multiple DBS leads were preoperatively positioned into the NHP thalamus of an additional animal in order to maximally cover the anterior to posterior expanse of CL and the DTTm fiber pathway (as shown in FIG. 8B). Utilizing a new biophysical modeling framework, as disclosed in Janson, et al., "Targeting Neuronal Fiber Tracts for Deep Brain Stimulation Therapy Using Interactive, Patient-Specific Models." *J. Vis. Exp.* 138:572-92 (2018), the disclosure of which is incorporated by reference herein in its entirety, the selective fiber activation within the two distinct pathways in all three animals was specifically modelled. The DTTm was modeled using deterministic tractography by first seeding the brainstem pedunculopontine nucleus (PPN) and then constraining fibers that passed through the CL and TRN nuclei, which then projected to prefrontal areas (as seen in FIG. 8B). Upon entering the ventral region of the thalamus from the brainstem, the DTTm projects rostrally across the span of the CL nucleus through the dorsal head of the TRN and into the internal commissures before radiating outward to prefrontal areas (see FIGS. 9A through 9C). Detailed segmentations of CL, Cm-Pf, and the TRN were taken from a full-brain atlas of the macaque monkey, as disclosed in Calabrese, et al., "A Diffusion Tensor MRI Atlas of the Postmortem Rhesus Macaque Brain." *Neuroimage.* 117, 408-416 (2015), the disclosure of which is incorporated by reference herein in its entirety, and registered to each animal's model.

FIG. 8A illustrates a coronal view of a gradient echo (GRE) image from the NHP MRI-DTI brain atlas used in the study Calabrese, et al., "A Diffusion Tensor MRI Atlas of the Postmortem Rhesus Macaque Brain." Neuroimage. 117, 408-416 (2015), the disclosure of which is incorporated by reference herein in its entirety, with cortical and thalamic boundaries shown on the left hemisphere. CL is indicated in the right hemisphere and the schematic outline of the scaled DBS lead (0.84 mm OD) illustrates the trajectory used to target CL and the DTTm fiber pathway. Shown is image 83, as disclosed in Elder, et al., "Chronic Implantation of Deep Brain Stimulation Leads in Animal Models of Neurological Disorders." *J. Neurosci. Methods.* 142, 11-16 (2005), the disclosure of which is incorporated by reference herein in its entirety.

FIG. 8 illustrates a sagittal view of the T2 imaging used for surgical planning of DBS lead trajectories. Here, one of the three six contact DBS leads (NuMed Inc.) implanted into the right thalamus of NHP3 is shown. The CL nucleus, shown in red, and the targeted fibers of the DTTm reconstructed from a high-resolution ex vivo dataset, shown in blue, illustrate the pathway of brainstem and anterior forebrain projections of fibers passing through and/or originating in the CL nucleus. The geometry of the CL nucleus spans ~5 mm A-P, 4 D-V, 1 mm M-L in the adult NHP.

Figures 10A, 10B:
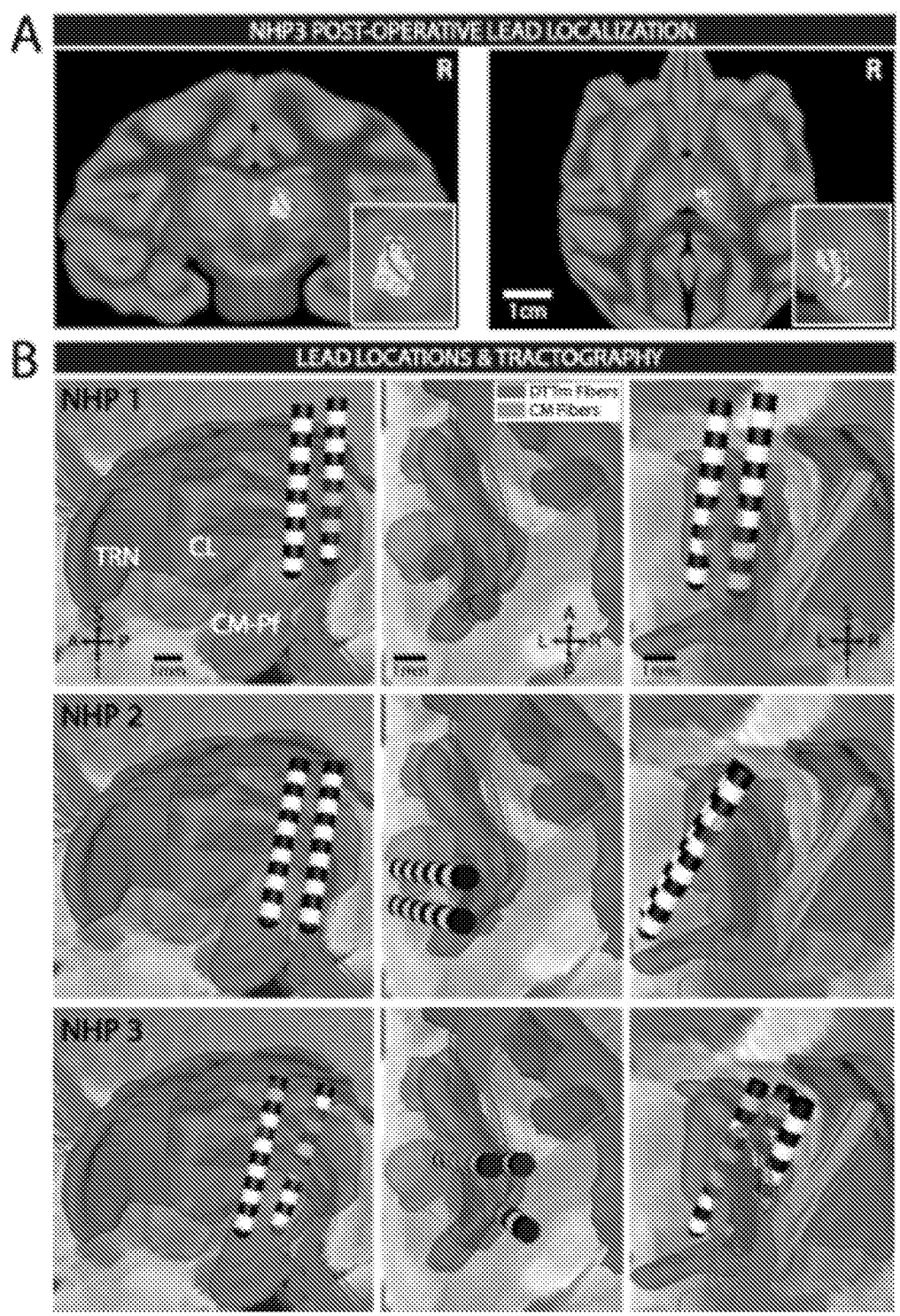
FIGS. 10A and 10B illustrate central thalamic deep brain stimulation (CT-DBS) of primary ascending arousal system pathway.

In each animal, post-implant computed tomography imaging was used to visualize the metallic artifacts produced by the individual DBS lead contacts (FIG. 10A) thereby enabling accurate registration of the virtual DBS leads into each animal's biophysical model, as disclosed in Janson, et al., "Targeting Neuronal Fiber Tracts for Deep Brain Stimulation Therapy Using Interactive, Patient-Specific Models." *J. Vis. Exp.* 138:572-92 (2018), the disclosure of which is incorporated by reference herein in its entirety (see Materials and Methods). The result of this registration is detailed in FIG. 10A for NHP3 and the contours of the individual contacts (see insets) can be clearly identified for each of the three DBS leads implanted. Using this method, the reconstructed DBS lead placements for each animal relative to the targeted CL nuclei (shown in red) along with two fiber pathways is shown in FIG. 10B. In addition to the DTTm fiber pathway (blue fibers in FIG. 10B), the Cm-Pf nucleus was used generate the predominant fiber pathway also projecting through TRN (orange fibers in FIG. 10B). As seen in FIG. 10B, the DTTm fibers, specifically modeled and targeted in NHP3, are clearly segregated from the Cm-Pf fibers as they project through the TRN (see Supplementary FIG. 9A-9C for additional views).

Behavioral Performance was Influenced by Choice of Stimulation Configuration and Amplitude.

Figures 11A, 11B, 11C, 11D:
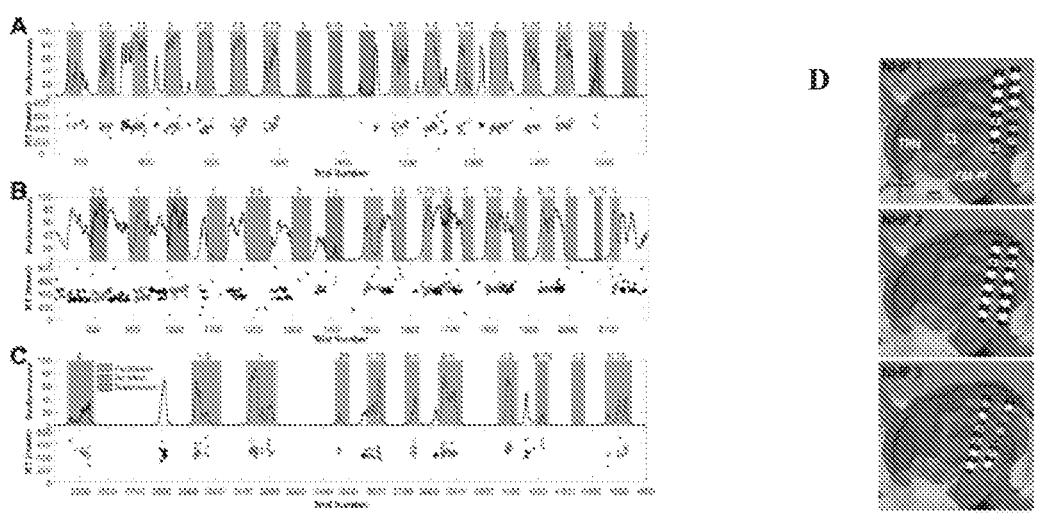
FIGS. 11A-11D illustrate the effects of CT-DBS amplitude on behavioral performance across animals.

Anode-cathode configurations comprising the lower three contacts of the two DBS leads in NHP1, the upper two contacts of the two DBS leads in NHP2, and the middle contacts of the caudal and rostral lateral DBS leads in NHP3 (see FIG. 10B) resulted in the most consistent facilitation of behavioral performance as shown in FIGS. 11A-11D. At the start of most experimental sessions the animals typically performed above 75% during the first 600+ trials and then performance typically decreased until the animal was satiated and ceased working, as disclosed in Baker, et al., "Robust Modulation of Arousal Regulation, Performance and Frontostriatal Activity Through Central Thalamic Deep Brain Stimulation in Healthy Non-Human Primates." *J. Neurophysiol.* 116:2383-2404 (2016) and Yao, et al., "Predicting Task Performance From Biomarkers of Mental Fatigue in Global Brain Activity." *J. Neural Eng.* 18:036001 (2020), the disclosures of which are incorporated by reference herein in their entirety. Around the time of natural performance decrement, the use of CT-DBS was able to facilitate and/or the restore performance, depending on the configuration and amplitude of stimulation. In these three example sessions, anodes were placed on the caudal lead and cathodes were placed on a rostral lead; however, the amplitude of stimulation was a key factor in all three animals. To quantify the effect of CT-DBS on performance the log of the odds ratio (LOR) was used to compare performance during trials just prior to CT-DBS onset to the block of trials during CT-DBS (see Materials and Methods). In NHP1 (FIG. 11A), current levels between 1.0 and 2.5 mA facilitated performance (positive LOR values, $p<0.05$), while current levels below or above this range had no or minimal effect on performance (FIG. 11A). In NHP2, current levels from 0.25 to 1 mA had either no effect or facilitated performance (FIG. 11B), while amplitudes 1.5 mA and above consistently suppress performance (negative LOR, $p<0.05$). In NHP3 amplitudes 0.5 to 1.5 mA facilitated performance while amplitudes 2 mA and higher tended suppressed performance. In NHP2 and NHP3, stimulation amplitudes above 2 mA tended to reduced or significantly suppressed performance when the effective field-shaping configurations were used (FIGS. 11B, 11C). Of note, amplitudes above 2.5 mA in NHP1 had similar suppressive effects on performance (FIG. 11A). The corresponding anode-cathode configurations used to enhance each animal's performance is shown in FIG. 11D. In all three animals, when the shape of the electrical field was parallel to the DTTm fiber pathway (FIG. 11D) and within a range of stimulation amplitudes, performance could be enhanced.

Figures 15A, 15B:
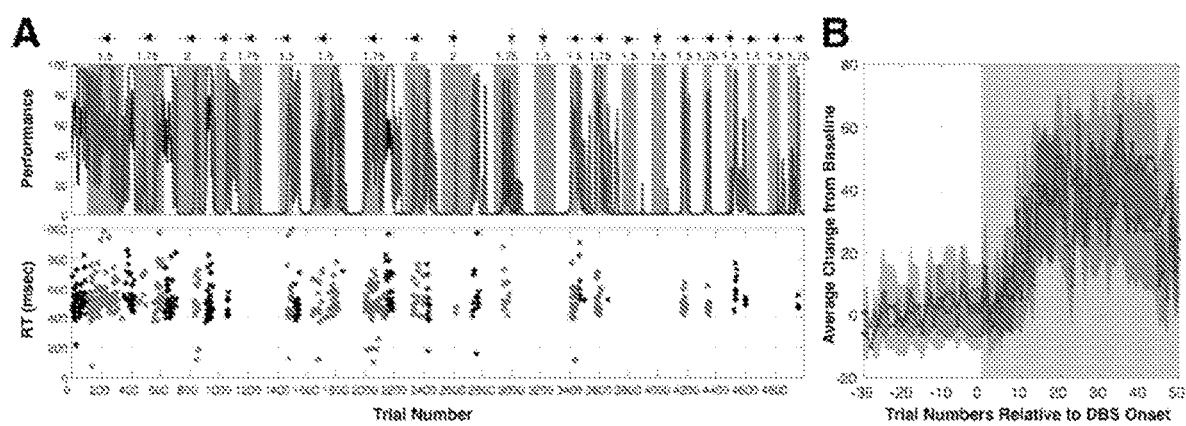
FIGS. 15A and 15B illustrate the effects of CT-DBS amplitude and configuration on engagement and performance in NHP3.

FIGS. 15A and 15B illustrate the performance estimate of NHP3. The performance estimate of NHP3 on the task is shown in the upper plot of FIG. 15A as a smoothly varying black line and the animals' engagement (see Materials and Methods) across trials is shown with a blue line. Periods of continuous high-frequency fsCT-DBS are colored according to the significance of the LOR value (p<0.05); facilitation in dark green, suppression in red, and gray for no effect. Stimulation amplitudes are noted above each CT-DBS period. The diode symbol above each DBS period indicates the anode-cathode configuration used: corresponds to cathodes set on contacts 1 and 2 (DBS lead 1) and anodes set on contacts 14 and 15 (DBS lead 3), corresponds to anodes set on contacts 1 and 2 (DBS lead 1) and cathodes set on contacts 14 and 15 (DBS lead 3), corresponds to anodes set on contact 1 (DBS lead 1) and contact 14 (DBS lead 3) and cathodes set on contact 2 (DBS lead 1) and contact 15 (DBS lead 3). The lower plot of FIG. 15A shows the reaction times of correctly performed trials with the same color code; black during the CT-DBS OFF periods. FIG. 15B illustrates the average change in behavioral performance (dark green) and engagement in the task (blue) when field-shaping CT-DBS (23 periods) was used in NHP3 and resulted in facilitation of performance. Each curve is normalized to pre-stimulation performance levels, including ±95% CI. Here, CT-DBS periods included configurations where one or two cathodes were set on contacts 1, 2, and/or 3 (DBS lead 1) and one or two anodes were set on contacts 13, 14, and/or 15 (DBS lead 3).

FIGS. 11A-11D illustrate the effects of CT-DBS amplitude on behavioral performance across animals. FIG. 11A shows the performance estimate of NHP1 on the visuomotor reaction time task is shown in the upper plot as a smoothly varying black line across consecutive trials. Periods of continuous high-frequency CT-DBS are indicated according to the significance of the LOR value (p<0.05); facilitation in green, suppression in red, and gray for no effect. Stimulation amplitudes (0.75-3.0 mA) are noted above each CT-DBS period and the same anode-cathode configuration was used. The lower plot shows the reaction times of correctly performed trials with the same color code; reaction times are in black for CT-DBS OFF periods. FIG. 11B is the same as in FIG. 11A, but for NHP2. In this session, CT-DBS stimulation amplitudes greater than 1.5 mA significantly suppressed performance whereas amplitudes 1.5 mA and below had either no effect or modestly facilitated performance. The same anode-cathode configuration was used throughout. FIG. 11C illustrates the same as in FIGS. 11A and 11B, but for NHP3. This animal performed a variation of the vigilance task that required more engagement with the task (see Materials and Methods); hence, the great number of trials. FIG. 11D illustrates reconstruction of the lead locations for each NHP shown in the sagittal plane, along with the CL, CM and TRN nuclei and the fibers of the DTTm. The anode (+) and cathode (−) field shaping configurations are shown for each of FIGS. 12A and 12B.

Figures 12A, 12B:
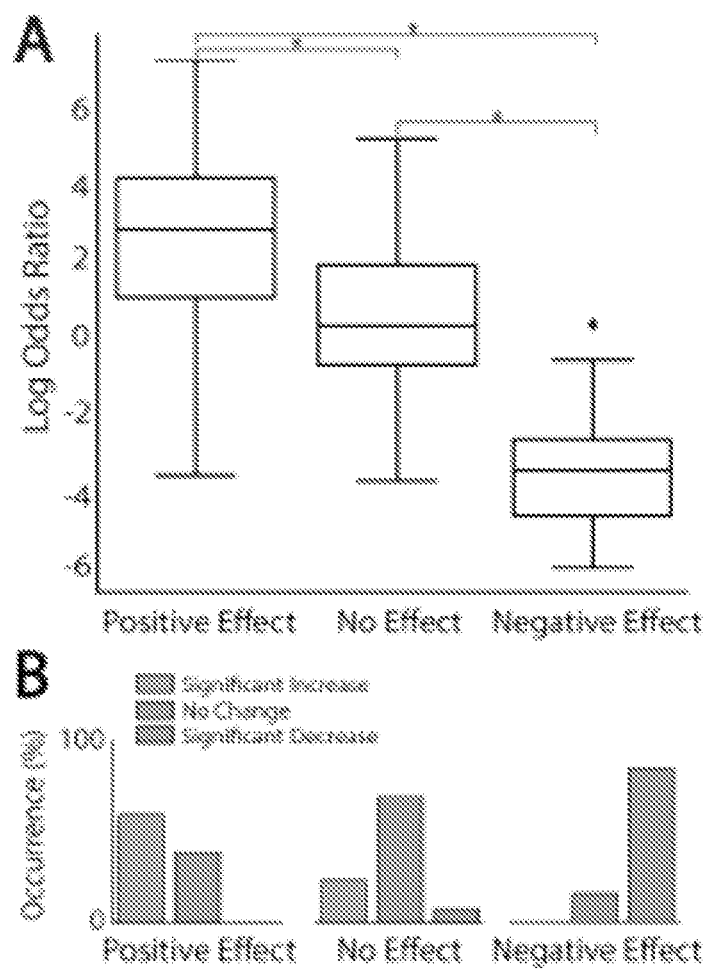
FIGS. 12A and 12B illustrate CT-DBS configuration-dependent effects on behavioral performance.

To summarize the effects of the anode-cathode configurations that facilitated performance across animals, the LOR for all these DBS periods were grouped into three effect groups, positive effect, no effect, and negative effect (FIG. 12A). Unpaired, two-tailed t-tests show that configurations in the positive effect group significantly increase behavioral performance over the no effect and negative effect groups.

The negative effect group significantly decreased behavioral performance over the no effect group, all with a p-value <0.001. FIG. 12B illustrates the normalized occurrence of a configuration in that group either facilitated, suppressed, or producing no significant change in performance during stimulation. The occurrence of performance facilitation is highest in the positive effect group, the occurrence of no significant effects is highest in the no effect group, and the occurrence of performance suppression is highest in the negative effect group. The distribution of these effects in each group emphasizes the choice of group for each configuration. Although the labels were manually assigned based upon knowledge of initial experimental results, the significant difference in performance between groups demonstrate that behavioral effect can be determined by configuration alone. These results also demonstrate that the NHPs were not trained to perform only in response to DBS since several configurations (see the no effect group) did not significantly change behavioral performance, even at similar amplitude levels to configurations in the positive effect group. To better understand these amplitude and configuration dependences the biophysical model was used to provide more insight into the specific activation of the DTTm and Cm-Pf fiber pathways.

Figures 13A, 13B:
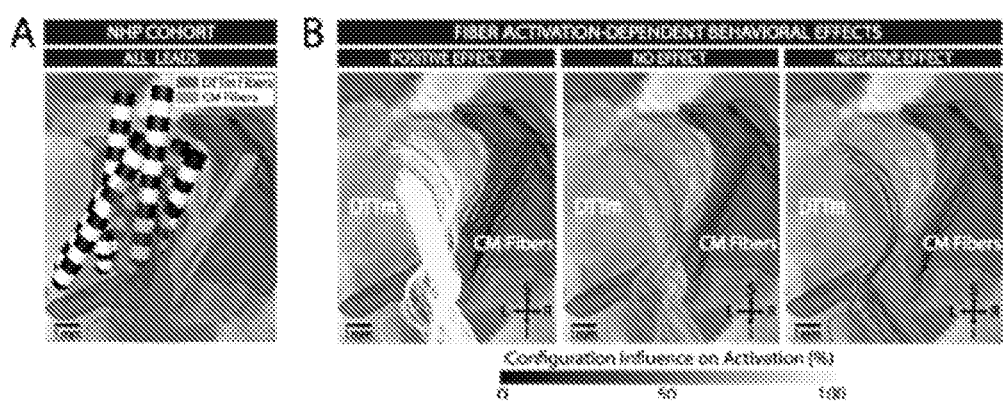
FIGS. 13A and 13B illustrate that effective stimulation configurations selectively activate thalamic pathways.

Shaping of the Electrical Field Selectively Activates the Medial Dorsal Tegmental Tract (DTTm) and Improves Behavioral Performance In each animal, all stimulation configurations and amplitudes tested during the behavioral experiments were simulated using finite element bioelectric field models and multi-compartment neuron simulations to predict the activation of both the DTTm and Cm-Pf fiber pathways. Individual fibers within the two simulated pathways were deemed activated if their membrane potential reached firing threshold when exposed to the stimulation waveform generated by the given configuration and amplitude. The combined lead locations for all three NHPs relative to targeted CL and DTTm fiber pathways are shown in FIG. 13A. All stimulation configurations with anodes and cathodes placed within were split into three groups based upon whether that configuration, based on the LOR, (a) produced clear positive effects on behavioral performance, (b) had no discernible effect at a majority of amplitudes, or (c) reliably produced negative effects on behavioral performance. The percentage of the number of configurations that activate each neuron was computed for each group, generating a group-wise influence on fiber activation (FIG. 13B). A value of 100% means that every configuration in that group activated that modeled neuron, which was observed in nearly every neuron fiber in the DTTm for the positive effect configuration group with minimal activation of Cm-Pf fibers. Each neuron fiber in the DTTm was activated by approximately 50% to 75% of the configurations of the no effect group, with a portion of the Cm-Pf fiber group activated by more configurations than the positive effect group. Approximately 50% or less of the configurations in the negative effect group activate neurons in the DTTm, and a considerable number of the Cm-Pf fibers are also activated by 50% of the configurations. Nearly every configuration in the positive effect group demonstrated distinct selective activation of the DTTm fiber pathway, which disappears into non-selective and diffuse activation of both pathways for configurations that produce no effect.

A multivariable linear mixed effects regression model was implemented to determine the influence of central thalamic fiber pathway activation on behavioral performance (Table 1). The percent activation of both the DTTm and Cm-Pf fiber pathways formed the explanatory variables for each experimental stimulation configuration. The response variable was the LOR of behavioral performance change for that stimulation period. The label of positive effect, no effect, or negative effect was not included in this analysis. Instead, the mixed effects model was clustered by each unique electrode configuration to control for repeated measurements. Activation of the DTTm pathway was shown to significantly improve behavioral performance ($\beta$=0.037, 95% CI [0.0018 to 0.055], p<0.001), and activation of the Cm-Pf pathway was shown to significantly decrease behavioral performance ($\beta$=−0.024, 95% CI [−0.046 to −0.001], p=0.039).

Table 1. Multivariable mixed effects regression model testing differences in behavioral performance over predicted activation of DTTm and Cm-Pf fibers.

|  | $\beta$ | 95% CI | P-value |
| --- | --- | --- | --- |
| DTTm | 0.037 | [0.018, 0.055] | <0.001 |
| CM-PF Fibers | −0.024 | [−0.046, −0.001] | 0.039 |

Performance during stimulation was best at lower amplitudes for these configurations and then tapered to zero as stimulation was increased to 3 mA (FIG. 13A), which demonstrated a clear window of optimal effect. For configurations in the positive effect group, the Cm-Pf pathway around 2 mA reaches approximately 50% activation at 3 mA (FIG. 13A). The configurations in both animals that produced the largest effect on performance utilized multi-lead field shaping with cathodes on the caudal lead and anodes on the rostral lead. The shape of these configurations is more aligned with the DTTm projection through the CL nucleus. Typical cathodic, monopolar stimulation, and bipolar stimulation (within a single lead) did not produce the same effects, and most monopolar stimulations produced stimulation-induced side effects or decreased performance. Configurations utilizing other contacts either resulted in no effect compared to off stimulation or drastically decreased behavioral performance when stimulation was applied.

Figures 14A, 14B, 14C:
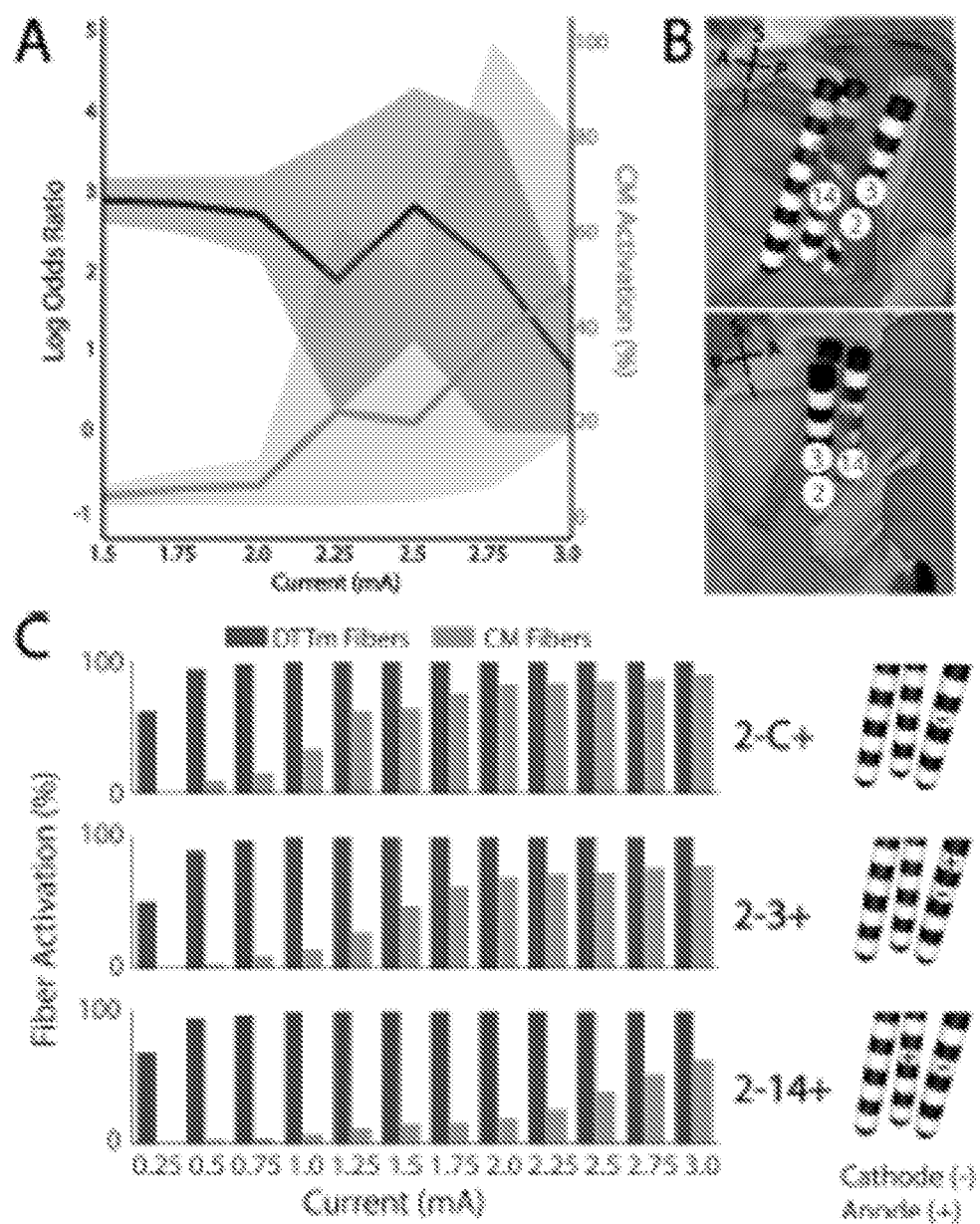
FIGS. 14A-14C illustrate selective activation of targeted fibers through electrical field-shaping.

The numbering scheme and placement of the leads relative to the fiber pathways in NHP3 are shown in FIG. 14B. Contacts 2 and 3 are located on the caudal lead and contact 14 is located on the rostral and more lateral lead. The caudal lead was positioned both where the DTTm enters the CL nucleus and in close proximity to the Cm-Pf complex and fibers. Cathodic stimulation of contact 2 (2-C+) is well positioned to activate the DTTm pathway; however, the generated field spreads uniformly in all directions, activating the Cm-Pf pathway at low amplitudes (FIG. 14C, top). A typical bipolar configuration with a single lead (2-3+) creates a directional stimulation field, and is able to maintain DTTm activation while reducing Cm-Pf activation. A marked reduction of Cm-Pf activation was demonstrated by shaping the stimulation field across the two leads (2-14+), which orients current both along the direction of the DTTm fibers and orthogonal to the Cm-Pf fibers. This configuration provided the largest window of DTTm activation while minimizing activation of Cm-Pf. As shown in FIG. 14A, there is still an amplitude limit for the optimal configurations and a rollover of the positive effects as performance is suppressed. In summary, these results highlight the sensitivity between facilitation and suppression of behavioral performance based upon minor variations in the location and shape of the stimulation field relative to the central thalamic fiber pathways.

Although preferred embodiments have been depicted and described in detail herein, it will be apparent to those skilled in the relevant art that various modifications, additions, substitutions, and the like can be made without departing from the spirit of the application and these are therefore considered to be within the scope of the application as defined in the claims which follow.

What is claimed is:

1. A method for selective activation of central thalamus fibers in a subject, said method comprising:
   providing one or more electrodes each with one or more contacts;
   positioning the one or more electrodes in the subject's central thalamus fibers; and
   applying an electrical stimulus to the positioned one or more electrodes to selectively activate the central thalamus fibers of the subject, wherein said positioning and said applying are carried out to maximize central lateral nucleus and medial dorsal tegmental tract fiber pathway activation in the subject and to minimize central median parafascicularis fiber pathway activation in the subject.

2. The method of claim 1, wherein a plurality of electrodes are provided and each of the plurality of electrodes has a plurality of spaced contacts.

3. The method of claim 1, wherein 75% to 100% of the medial dorsal tegmental tract fibers in the central thalamus of the subject are stimulated in carrying out said method and less than 25% of the central medial parafascicularis fibers in the central thalamus of the subject are stimulated in carrying out said method.

4. The method of claim 1, wherein 90% to 100% of the medial dorsal tegmental tract fibers in the central thalamus of the subject are stimulated in carrying out said method and less than 10% of the central medial parafascicularis fibers in the central thalamus of the subject are stimulated in carrying out said method.

5. The method of claim 1, wherein said applying an electrical stimulus is carried out at 0.1 to 25.0 milliamps or 0.1 to 10.5 volts, selected independently for each of the one or more electrodes using continuous, intermittent or periodic stimulation.

6. The method of claim 1, wherein said applying an electrical stimulus is ramped up or down at different rates of speed.

7. The method of claim 1, wherein said applying an electrical stimulus is carried out at one or more frequencies of from 1 Hz to 10 kHz using voltage wave trains having a monophasic or biphasic sine, square, spike, rectangular, triangular or ramp configuration.

8. The method of claim 1, wherein said applying an electrical stimulus is carried out using one or more stimulation programs that are capable of being interleaved in time.

9. The method of claim 1, further comprising:
   providing at least one sensor in communication with the subject's brain;
   determining a state of neuronal activity in the subject's brain based on data from said at least one sensor; and
   adjusting said applied electrical stimulus based on the determined state of neuronal activity in the subject's brain.

10. The method of claim 1, further comprising:
    imaging the subject's brain;
    segmenting the central thalamus of the subject's imaged brain to produce a segmented brain model;
    identifying electrode positions and electrical stimulation conditions within the segmented brain model that will maximize central lateral nucleus and medial dorsal tegmental tract fiber pathway activation in the subject and minimize central medial parafascicularis fiber pathway activation in the subject; and producing a stimulation map based on said identifying, wherein said stimulation map is used to carry out said positioning and said applying.

11. The method of claim 1, further comprising selecting the subject, wherein the subject has impaired arousal regulation characterized by brain injury, a neurological degenerative disease, epilepsy, a movement disorder, a post-encephalitis cognitive impairment, a developmental disorder, a post hypoxic-ischemic injury cognitive impairment, or a neuropsychiatric disorder.

12. The method of claim 1, further comprising:
segmenting the central thalamus in an image of a subject's brain to produce a segmented brain model;
modelling one or more fiber pathways in the segmented brain model;
generating initial model electrode positions in the segmented brain model; and
producing a stimulation map based on said modelling and generating, wherein said stimulation map is used to carry out said positioning and said applying.

* * * * *